(12) United States Patent
Morigaki et al.

(10) Patent No.: US 8,062,793 B2
(45) Date of Patent: Nov. 22, 2011

(54) LITHIUM PRIMARY BATTERY AND MANUFACTURING METHOD THEREFOR

(75) Inventors: Kenichi Morigaki, Hyogo (JP); Susumu Yamanaka, Osaka (JP); Tohru Hitomi, Osaka (JP); Shinji Fujii, Osaka (JP); Toshihiko Ikehata, Osaka (JP)

(73) Assignee: Panasonic Corporation, Osaka (JP)

( * ) Notice: Subject to any disclaimer, the term of this patent is extended or adjusted under 35 U.S.C. 154(b) by 1194 days.

(21) Appl. No.: 11/720,151

(22) PCT Filed: Oct. 7, 2005

(86) PCT No.: PCT/JP2005/018604
§ 371 (c)(1),
(2), (4) Date: May 24, 2007

(87) PCT Pub. No.: WO2006/057110
PCT Pub. Date: Jun. 1, 2006

(65) Prior Publication Data
US 2009/0123844 A1 May 14, 2009

(30) Foreign Application Priority Data

Nov. 26, 2004 (JP) .................................. 2004-342202
Apr. 22, 2005 (JP) .................................. 2005-125456
Apr. 25, 2005 (JP) .................................. 2005-126139

(51) Int. Cl.
*H01M 4/40* (2006.01)
*H01M 4/62* (2006.01)
(52) U.S. Cl. .................................. 429/231.95; 429/232
(58) Field of Classification Search ............. 429/231.95, 429/232, 235, 246
See application file for complete search history.

(56) References Cited

U.S. PATENT DOCUMENTS

| 5,503,946 | A | | 4/1996 | Fauteux et al. ............... 429/50 |
| 6,019,802 | A | * | 2/2000 | Ishizuka et al. ........... 429/232 X |
| 6,558,847 | B1 | * | 5/2003 | Kawakami et al. ...... 429/231.95 |
| 6,949,312 | B1 | * | 9/2005 | Kawakami et al. ........ 429/218.1 |
| 2002/0119373 | A1 | * | 8/2002 | Gao et al. ............. 429/231.95 X |

FOREIGN PATENT DOCUMENTS

| JP | 1211856 | 8/1989 |
| JP | 42050 | 1/1992 |
| JP | 594837 | 4/1993 |
| JP | 5266883 | 10/1993 |
| JP | 06036800 | 2/1994 |
| JP | 06168737 | 6/1994 |
| JP | 10172540 | 6/1998 |
| JP | 2002-516643 | 6/2002 |

OTHER PUBLICATIONS

PCT International Search Report dated Jan. 17, 2006.

* cited by examiner

*Primary Examiner* — Stephen J. Kalafut
(74) *Attorney, Agent, or Firm* — Dickinson Wright PLLC

(57) ABSTRACT

A lithium primary battery including a positive electrode, a negative electrode, an organic electrolyte, and a separator interposed between the positive electrode and the negative electrode: the negative electrode including a negative electrode active material; the negative electrode active material being at least one selected from the group consisting of lithium metal and a lithium alloy; at least a surface layer portion of the negative electrode including a composite of amorphous carbon material and the negative electrode active material; and the surface layer portion facing the positive electrode with the separator interposed therebetween.

16 Claims, 2 Drawing Sheets

LITHIUM PRIMARY BATTERY AND MANUFACTURING METHOD THEREFOR

TECHNICAL FIELD

The present invention relates to a lithium primary battery including a negative electrode including at least one selected from the group consisting of a lithium metal and a lithium alloy as a negative electrode active material, and particularly relates to a lithium primary battery that is excellent in at least one of large current discharge performance at low temperature and storage characteristics at high temperature.

BACKGROUND ART

Since a lithium primary battery using a lithium metal or its alloy for the negative electrode active material has a high voltage and high energy density compared with conventional aqueous solution-type batteries, achieving downsizing and weight reduction is easy. Therefore, lithium primary batteries are applied for various usages, such as for a main power source of small electronic devices and for a back-up power source.

For the positive electrode active material of lithium primary batteries, generally, a metal oxide such as manganese dioxide, and graphite fluoride are used. The lithium primary battery using graphite fluoride is especially excellent in long-term storage and stability in high temperature range, and can be used in a wide temperature range, compared with those batteries using manganese dioxide.

However, as electronic devices becoming more multi-functional and small-sized, a further improvement in lithium primary battery performance is demanded. Particularly, in the case of a main power source for electronic devices to be mounted on automobiles and a back-up power source, sufficient discharge performance is required in a temperature range from low temperature to high temperature (about −40° C. to about 125° C.). When discharged at a large current, lithium primary batteries show characteristic drop in voltage in the initial stage of discharge and then gradual increase in voltage. In the lithium primary battery using graphite fluoride, the degree of voltage drop in the initial stage is high especially in the discharge in low temperature range.

One of the factors of the decline in discharge performance at low temperature is changes in viscosity of the organic electrolyte. The viscosity of γ-butyrolactone (γBL) used as the solvent of the electrolyte increases at low temperature. Therefore, ion conductivity of the electrolyte decline at low temperature. There has been proposed a usage of a solvent mixture in which 1,2-dimethoxyethane having a low boiling point and a low viscosity and γBL are mixed in a volume ratio of 1:1. In this case, there is an increase in the discharge voltage at a low temperature range of about −20° C., showing the effects of improvement. However, in such batteries, the degree of gas generation is high when stored at high temperature of about 100° C. Thus, there is a drawback in that batteries expand during storage at high temperature and normal discharge is disabled.

Further, in lithium primary batteries, the internal resistance is increased by storage at high temperature. Thus, when a battery stored at a high temperature of for example about 125° C. is discharged, the voltage drop immediately after the discharge becomes intense.

When the positive electrode polarization and negative electrode polarization are measured by a low temperature discharge −20° C. or less, in the early stage of discharge, the degree of polarization becomes higher in the negative electrode than in the positive electrode. In the batteries after a high temperature storage as well, the degree of polarization in the negative electrode becomes high. Therefore, by reducing the reaction over-voltage of negative electrode, low temperature characteristics and storage characteristics at high temperature can be improved greatly.

In the field of lithium secondary batteries, for an improvement in charge and discharge reaction, researches have been conducted on surface modification of a negative electrode comprising a lithium metal. Particularly, to reduce dendrite generation, there has been proposed a formation of a cover layer comprising carbon on the negative electrode surface (Patent Documents 1 and 2).

However, in primary batteries, which are not charged, the dendrite generation is not a great problem in the first place. Additionally, lithium metal melts from its surface by discharge. Therefore, even though a film or a layer is formed for the surface modification of the negative electrode, these are separated at the time of discharge. Thus, there is substantially no attempt to apply the surface modification techniques in the negative electrode of lithium secondary batteries to primary batteries.

[Patent Document 1]
Japanese Laid-Open Patent Publication No. Hei 6-168737
[Patent Document 2]
Japanese Laid-Open Patent Publication No. Hei 10-172540

DISCLOSURE OF THE INVENTION

Problem To be Solved by the Invention

Lithium primary batteries, especially lithium primary batteries using graphite fluoride for its positive electrode, behave in such a manner that at a large current discharge, the voltage drops greatly in the early stage of discharge and gradually increases afterwards. Especially in the case of large current discharge under low temperature environment of 0° C. or less, the voltage drop in the early stage of discharge is notable. Also, when lithium primary batteries are stored at high temperature, the internal resistance of the battery increases mainly due to an increase in interface resistance of the negative electrode (a resistance from a film of electrolyte decomposition product). Therefore, in the discharge thereafter, the degree of the voltage drop immediately after the start of discharge becomes intense. Especially, in the case of lithium primary batteries using manganese dioxide for the positive electrode, when the batteries are stored at high temperature after a partial discharge, the increase in internal resistance and decline in discharge performance become notable. This is thought to be due to disproportionation of $Mn^{3+}$ to $Mn^{4+}$ and $Mn^{2+}$, and dissolution of $Mn^{2+}$.

Means for Solving the Problem

The present invention relates to decreasing a negative electrode polarization in lithium primary batteries, especially to decreasing a negative electrode polarization at the time of large current discharge with low temperature or after high temperature storage. Based on the present invention, large current discharge performance at low temperature and storage characteristics at high temperature of lithium primary batteries can be improved without sacrificing other aspects of battery performance and reliability.

A lithium primary battery of the present invention comprises a positive electrode, a negative electrode, an organic electrolyte, and a separator interposed between the positive electrode and the negative electrode: the negative electrode including a negative electrode active material, and the negative electrode active material comprising at least one selected from the group consisting of a lithium metal and a lithium alloy.

The negative electrode has any one of the characteristics of (a) to (c) below.

(a) At least a surface layer portion of the negative electrode comprises a composite of an amorphous carbon material and a negative electrode active material, said surface layer portion facing the positive electrode with the separator interposed therebetween.

(b) At a predetermined depth of the negative electrode, in a range of 5 nm to 15 nm from the surface thereof facing the positive electrode, halogen atoms, lithium atoms, and oxygen atoms are present, and a molar ratio of halogen atoms to lithium atoms, X/Li, is 0.7 or less, and a molar ratio of halogen atoms to oxygen atoms, X/O, is 1.3 or less. In this case as well, at least a surface layer portion of the negative electrode preferably comprises a composite of an amorphous carbon material and the negative electrode active material, and the surface layer portion faces the positive electrode with the separator interposed therebetween.

(c) The negative electrode includes a surface layer portion to which microparticles are embedded; the microparticles comprise primary particles with an average particle size (median size) of 2 μm or less; and the surface layer portion faces the positive electrode with the separator interposed therebetween.

When the negative electrode has the characteristic of the above (a), the negative electrode may be a multi-layered structure including a surface layer portion comprising a composite of an amorphous carbon material and a negative electrode active material, and a lower layer portion comprising the negative electrode active material. In this case, the thickness of the surface layer portion is preferably ⅓ or less of the thickness of the negative electrode.

When the negative electrode has the characteristic of the above (b), halogen atoms are derived from anion decomposition of a solute included in the organic electrolyte or from impurities (HF and the like) of the solute. When a solute including fluorine (for example, $LiBF_4$) is used, lithium fluoride (LiF) is present at a predetermined depth of the negative electrode, in a range of 5 nm to 15 nm from the surface thereof facing the positive electrode. When a solute including chlorine (for example, lithium perchlorate) is used, lithium chloride (LiCl) is present. A thin oxide film is present at the surface of the lithium metal. When a battery is preliminary discharged after assembly, the oxide film is destroyed. Afterwards, lithium and organic electrolyte react to form a new film. At that time, halogen atoms are incorporated into the negative electrode. Oxygen is derived from a non-aqueous solvent included in the organic electrolyte. Oxygen forms, for example, lithium carbonate $Li_2CO_3$. LiF and $Li_2CO_3$ are thought to work as a protective film for the negative electrode in the organic electrolyte.

Lithium ions are easily diffused in $Li_2CO_3$ than in LiF. When a large amount of lithium fluoride (LiF) is present in the negative electrode surface layer portion, migration of lithium ions to the negative electrode is not easily caused. Therefore, reaction resistance (overvoltage) is thought to be increased. Thus, by curbing the generation of halogenated lithium such as lithium fluoride, the negative electrode polarization can be decreased.

For a method to analyze the composition at a predetermined depth of the negative electrode, in a range of 5 nm to 15 nm from the surface thereof facing the positive electrode, X-ray photoelectron spectroscopy analysis (XPS) is the most general method. In XPS, the amount of element A (NA) that is present can be determined from the formula below.

$NA$=(peak area of element $A$)×(correlation factor of element $A$)

The correlation factor is dependent on the measurement device. By determining the amount of the all of the elements that are present, a molar ratio of the element can be calculated. Usually, by auto-calculation function of the analysis device, the amount of the element that is present and a molar ratio can be obtained.

In the negative electrode with an organic electrolyte attached, it is difficult to remove the organic matter completely even though washed with a solvent with a low boiling point. Therefore, the analysis results on the outermost surface are greatly affected by the matter attached. Thus, generally, after etching by sputtering with argon ions, XPS analysis is carried out. The etching rate by sputtering with argon ions is accurately measured by using $SiO_2$ sample. Usually, in other sample as well, the etching rate of $SiO_2$ sample is applied. For example, when the measurement device is Model 5600 manufactured by Physical Electronics, Inc., and the sputtering with argon ions is carried out with an accelerating voltage of 3 kV, the etching rate is 7.4 nm/min. The surface of the negative electrode facing the positive electrode before etching is considered as the outermost surface (a depth of 0 nm), and the composition at a predetermined depth, in a range of 5 nm to 15 nm from the outermost surface is analyzed.

When the negative electrode includes amorphous carbon, in the negative electrode as a whole, the amorphous carbon material content in the total of the negative electrode active material and the amorphous carbon material is preferably 5 wt % or less. In the surface layer portion as well, the amorphous carbon material content in the total of the negative electrode active material and the amorphous carbon material is preferably 5 wt % or less.

The amorphous carbon material is preferably microparticles comprising primary particles with an average particle size (median size) of 0.1 μm or less. Additionally, the amorphous carbon material is preferably microparticles with a BET specific surface area of 20 $m^2$/g or more for example by nitrogen adsorption. For the amorphous carbon material, for example, carbon black of at least one selected from the group consisting of acetylene black, ketjen black, contact black, furnace black, and lamp black is preferably used.

When the negative electrode has the characteristic of the above (c), for microparticles, ceramics, a lithium compound, and a carbon material may be used. These may be used singly, or may be used in combination of two or more.

For ceramics, $Al_2O_3$, $Fe_2O_3$, SiC, $SiO_2$, $ZrO_2$ may be used. These may be used singly, or may be used in combination of two or more. These ceramics have a degree of hardness that can be pressed in to the lithium or lithium alloy surface easily. Additionally, these ceramics are less reactive with lithium.

For the lithium compound, $Li_3PO_4$ and $Li_2SO_4$ may be used. These may be used singly, or may be used in combination of two or more.

For the carbon material, graphite, petroleum coke, and activated carbon may be used. These may be used singly, or may be used in combination of two or more. When graphite microparticles are to be used, at the surface layer portion to which microparticles are embedded, reaction of lithium intercalation to graphite layers occurs. By this reaction, a lithium-graphite intercalational compound of red or gold is produced.

As particularly preferable microparticles, the following can be mentioned.
(i) Carbon particles comprising primary particles with an average particle size (median size) of 0.1 μm or less.
(ii) Carbon particles with a BET specific surface area of 20 $m^2/g$ or more by nitrogen adsorption method.
(ii) Carbon black of at least one selected from the group consisting of acetylene black, ketjen black, contact black, furnace black, and lamp black. In these carbon blacks as well, primary particles preferably have an average particle size (median size) of 0.1 μm or less, and a BET specific surface area of 20 $m^2/g$ or more by nitrogen adsorption method.

The above carbon particles (i) to (iii) curbs the increase in internal resistance of batteries. Therefore, the negative electrode polarization while discharging can be effectively reduced.

The lithium alloy that can be included in the negative electrode active material includes, for example, a small amount of aluminum (Al) and tin (Sn). In the case of lithium alloy, improvements in property and surface condition can be expected, compared with lithium metal. However, in the case of alloys, increase in the melting point and hardness may cause decline in workability, compared with lithium. Therefore, the metal other than lithium included in the lithium alloy is preferably in small amount. The metal other than lithium is preferably 5 wt % or less of the whole alloy, for example.

The positive electrode includes a positive electrode active material, a conductive material, and a binder. The positive electrode active material preferably includes a metal oxide or graphite fluoride. The present invention is especially effective when graphite fluoride is used. For a metal oxide as the positive electrode active material, manganese dioxide may be mentioned. Although the manufacturing method for the positive electrode is not particularly limited, for example, a positive electrode active material comprising metal oxide or graphite fluoride, a conductive material, and a binder may be blended for the usage.

For the organic electrolyte, a non-aqueous solvent in which a solute is dissolved may be used. The solute preferably includes lithium tetrafluoroborate. The non-aqueous solvent preferably includes γ-butyrolactone.

The present invention also relates to a method for manufacturing a lithium primary battery, the method comprising the steps of:
preparing a negative electrode including a composite of a negative electrode active material and an amorphous carbon material at least a surface layer portion thereof, and a negative electrode active material comprising at least one selected from the group consisting of a lithium metal and a lithium alloy; and
allowing the surface layer portion comprising the composite to face a positive electrode with a separator interposed therebetween.

The present invention also relates to a method for manufacturing a lithium primary battery, the method comprising the steps of:
preparing a negative electrode including a composite of a negative electrode active material and microparticles at a surface layer portion thereof, the negative electrode active material comprising at least one selected from the group consisting of a lithium metal and a lithium alloy, and the microparticles comprising primary particles with an average particle size (median size) of 2 μm or less; and
allowing the surface layer portion comprising the composite to face a positive electrode with a separator interposed therebetween.

For the step for preparing a negative electrode including a composite of a negative electrode active material and an amorphous carbon material at least a surface layer portion thereof, for example, the following may be mentioned.

First, a step for preparing a mixture including an amorphous carbon material and a negative electrode active material, and forming the mixture into a negative electrode of a predetermined form may be mentioned.

Second, a step for preparing a mixture including an amorphous carbon material and a negative electrode active material, rolling the mixture to form a thin sheet, and attaching the obtained mixture sheet to the negative electrode active material (for example, lithium metal) sheet by pressure may be mentioned.

Third, a step for preparing a paste including an amorphous carbon material, a binder, and an organic solvent; applying the paste on a negative electrode active material (for example, lithium metal) sheet and then drying; and rolling the film and the sheet simultaneously may be mentioned.

Fourth, a step for spraying an amorphous carbon material on a negative electrode active material (for example, lithium metal) surface, and rolling the amorphous carbon material and the sheet simultaneously may be mentioned. Before the rolling, the negative electrode active material sheet may be heated to 100 to 200° C. with a hot plate, so that the amorphous carbon material may be attached to the sheet easily.

The step for preparing the negative electrode including the amorphous carbon material on at least a surface layer portion thereof is preferably carried out in an argon gas atmosphere or under a reduced-pressure atmosphere of 100 Pa or less. Carbon black is microparticles with a large BET specific surface area. Therefore, carbon black is extremely flammable, adsorbs a large amount of oxygen, and works as an oxidant. Thus, when allowed to contact lithium metal, i.e., a strong reductant, in dry air (a dew point −50° C. or less), oxidation-reduction reaction may advance rapidly. Additionally, when carbon black is allowed to contact lithium metal in a dry nitrogen atmosphere, lithium and nitrogen react to produce lithium nitride.

A negative electrode including a composite of a negative electrode active material and microparticles at least a surface layer portion thereof may be obtained, for example, by simply embedding microparticles comprising primary particles with an average particle size of 2 μm or less onto the negative electrode surface layer portion. For example, by attaching microparticles by pressure on the negative electrode surface or pressing in microparticles on the negative electrode surface, the microparticles may be embedded to the negative electrode surface layer portion.

EFFECT OF THE INVENTION

Based on the present invention, the increase in the battery internal resistance in the low temperature range can be curbed, and the reaction overvoltage of the negative electrode can be decreased, leading to an improvement in large current discharge performance at low temperature. Also, an increase in battery internal resistance at the time of high temperature storage can be curbed. Further, even when the battery after partial discharge is stored at high temperature, discharge performance after storage can be improved. Thus, based on the present invention, a reliable lithium primary battery excellent in large current discharge performance at low temperature and high temperature storage can be provided.

Based on the present invention, active points of discharge reaction can be increased, negative electrode reaction overvoltage can be decreased, and low temperature discharge performance can be improved. Also, based on the present invention, high temperature stability and long-term reliability in lithium primary batteries are not greatly lost. Since the present invention relates to primary batteries, charging reaction is not assumed at all. Thus, bringing out the effects of curbing negative electrode polarization at the early stage of discharge is sufficient.

In the following, how the effects of the present invention are brought out are described.

Discharge reaction of lithium primary batteries is a reaction in which lithium ions are dissolved from the negative electrode, and lithium ion are intercalated into the positive electrode active material. Discharge reaction involves electron resistance of the positive electrode and the negative electrode, resistance to ion transportation in the electrolyte with which the electrode and the separator are impregnated, and reaction resistance involved with migration electric charge of the positive electrode and the negative electrode. Overvoltage due to these resistance elements changes due to conditions such as the electrode structure, the battery structure, discharge temperature, and discharge current density. The negative electrode overvoltage is smaller than the positive electrode overvoltage, in a high temperature range of over 0° C. However, in a low temperature range of 0° C. or less, the negative electrode overvoltage rapidly increases, and sometimes exceeds that of the positive electrode depending upon conditions.

In discharge, reaction in which lithium ions are dissolved from the negative electrode is thought to be caused by grain boundary and crystal defect in the lithium metal and the lithium alloy. Crystal defect is formed at the time of extrusion process of the lithium metal and the lithium alloy, or when rolling. At the lithium metal and lithium alloy surface, a film comprising lithium oxide and the like is present. In the organic electrolyte, a film comprising reduction-decomposition product of electrolyte mainly composed of lithium carbonate is present. These films works as a protective film for curbing the electrolyte decomposition, but also works to curb dissolution reaction of lithium ions.

By preliminary discharging batteries immediately after lithium primary battery assembly, films formed on the lithium metal and lithium alloy surface before assembly are thought to be destroyed. Thus, reaction resistance of the negative electrode is mainly dependent on the film comprising decomposition product of the organic electrolyte.

When the negative electrode surface layer portion contains an amorphous carbon material, immediately after battery assembly, at the interface between the negative electrode and the organic electrolyte, lithium ions are temporally intercalated into the amorphous carbon material, and advances decomposition reaction of electrolyte. As a result, the electrolyte decomposition product is formed in a short period of time at the interface between the negative electrode and the electrolyte. The decomposition product works as a protective film for curbing continuous electrolyte decomposition. This protective film is stable compared with the film formed when a lithium metal and a lithium alloy are singly used, and curbs the increase in battery internal resistance due to electrolyte decomposition afterwards.

The negative electrode reaction resistance is heavily dependent upon temperature, and usually, suddenly increases in a low temperature range (especially 0 or below). However, as mentioned above, since the increase in the internal resistance of battery is curbed, a sudden increase in negative electrode overvoltage is curbed even in a low temperature range. Similarly, at the time of high temperature storage as well, increase in the internal resistance of battery is curbed, and the negative electrode polarization in the early stage of discharge after storage is greatly reduced. Further, even when the battery partially discharged was stored at high temperature, the effects of curbing an increase in the internal resistance can be obtained. The effects are especially great when the amorphous carbon material is present up to the inner portion of the negative electrode.

Additionally, by embedding microparticles comprising primary particles with an average particle size of 2 μm or less on the negative electrode surface layer portion, a new defects are formed in crystal of the lithium metal and the lithium alloy. Therefore, reaction active points where lithium ions are dissolved from the negative electrode increase, and the negative electrode reaction overvoltage decreases.

When graphite is used as the microparticles, a lithium-graphite intercalational compound is formed. The lithium-graphite intercalational compound causes the lithium ion dissolution reaction similarly to the negative electrode material of lithium ion secondary batteries. Thus, at the time of discharging, not only lithium ion dissolution reaction from the lithium metal and the lithium alloy, lithium ion dissolution reaction from intercalational compound can also be utilized. Therefore, the negative electrode reaction overvoltage can be further decreased.

For the microparticles, (i) carbon particles comprising primary particles with an average particle size (median size) of 0.1 μm or less; (ii) carbon particles with a BET specific surface area of 20 $m^2/g$ or more by a nitrogen adsorption method; or (iii) at least one carbon black selected from the group consisting of acetylene black, ketjen black, contact black, furnace black, and lamp black is effectively used. When these are used, although reasons are unclear at this point, the effects of curbing an increase in internal resistance of battery can be seen. For the reasons, the following effects are assumed.

When a solvent of an organic electrolyte used in primary batteries (for example, propylene carbonate and γ-butyrolactone) is used in lithium ion secondary batteries in which general carbon material is used as the negative electrode active material, the solvent decomposition reaction is known to advance in batteries. At the interface between the carbon particles embedded to the negative electrode surface layer portion and the electrolyte as well, similar decomposition reaction is thought to be generated. This decomposition product curbs the electrolyte decomposition reaction at the lithium/electrolyte interface, and thought to curb an increase in battery internal resistance afterwards.

BEST MODE FOR CARRYING OUT THE INVENTION

Figure 1:
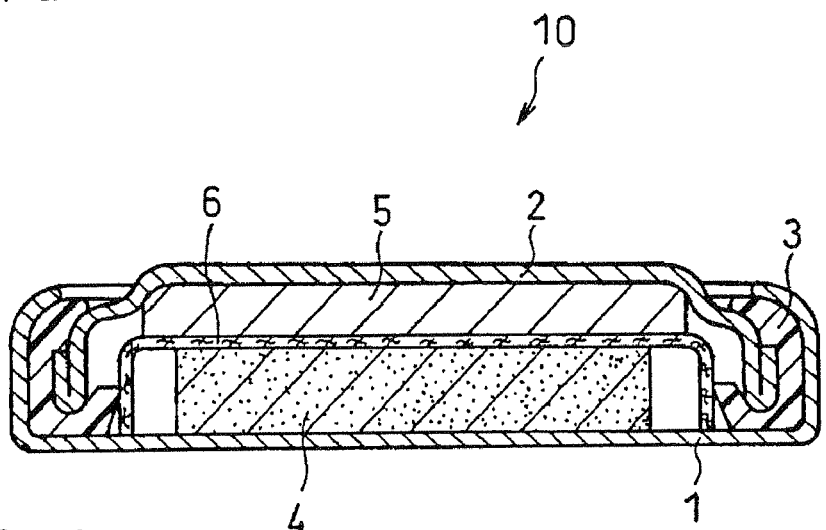
[FIG. 1] A vertical cross section of a coin-type lithium primary battery in accordance with the present invention.

A lithium primary battery of the present invention comprises a positive electrode, a negative electrode, an organic electrolyte, and a separator interposed between the positive electrode and the negative electrode. The form or the structure of the battery is not particularly limited, and includes, for example, cylindrical, prismatic, button, and coin types. The lithium primary battery of the present invention mainly relates to an improvement in the negative electrode, and there are no particular limitation on compositions and structures of the positive electrode, the organic electrolyte, and the separator.

The negative electrode includes a negative electrode active material, and the negative electrode active material comprises at least one selected from the group consisting of a lithium metal and a lithium alloy.

The negative electrode has one of the characteristics of (a) to (c) below.

(a) At least a surface layer portion of the negative electrode comprises a composite of an amorphous carbon material and the negative electrode active material, and the surface layer portion faces the positive electrode with the separator interposed therebetween. The surface layer portion of the negative electrode may include unavoidable impurities and a carbon material other than the amorphous carbon, in addition to the amorphous carbon material and the negative electrode active material.

(b) At a predetermined depth of the negative electrode, in a range of 5 nm to 15 nm from the surface thereof facing the positive electrode, halogen atoms, lithium atoms, and oxygen atoms are present: a molar ratio of halogen atoms to lithium atoms, i.e., X/Li, is 0.7 or less, and a molar ratio of halogen atoms to oxygen atoms, i.e., X/O, is 1.3 or less. In this case as well, at least a surface layer portion of the negative electrode comprises a composite of an amorphous carbon material and the negative electrode active material, and the surface layer portion faces the positive electrode with the separator interposed therebetween.

(c) The negative electrode includes a surface layer portion to which microparticles are embedded; the average particle size (median size) of the primary particles of the microparticles is 2 μm or less; and the surface layer portion faces the positive electrode with the separator interposed therebetween. The surface layer portion of the negative electrode may include unavoidable impurities, other than the microparticles and the negative electrode active material.

The lithium metal is a simple substance of lithium usually in metal state, and may include a trace amount of impurities. The lithium alloy includes a metal other than lithium, for example, a small amount of aluminum (Al), tin (Sn), magnesium (Mg), indium (In), and calcium (Ca). The metal content other than lithium included in the lithium alloy is preferably for example 5 wt % or less of the alloy as a whole, and further preferably 1 wt % or less. The negative electrode may be formed by using a combination of the lithium metal and the lithium alloy.

The composition of the negative electrode active material may be changed by portions of the negative electrode. For example, a simple substance of lithium may be used for the surface layer portion of the negative electrode, and a lithium alloy may be used for the lower layer portion. For the lower layer portion, for example, a lithium alloy including 0.2 wt % of aluminum is preferably used.

The negative electrode with the above characteristic (a) or (b) may be made from a mold of the negative electrode active material or of a mixture including the negative electrode active material and the amorphous carbon. The mixture including the negative electrode active material and the amorphous carbon includes, a mixture including a lithium metal and an amorphous carbon, a mixture including a lithium alloy and an amorphous carbon, and a mixture including a lithium metal, a lithium alloy, and an amorphous carbon. For example, the negative electrode may be made from a lithium metal or a lithium alloy formed into a sheet or an electrode form. Also, the negative electrode may be made from a mixture including a negative electrode active material and an amorphous carbon material made into a sheet or an electrode form. Upon molding the lithium metal or the lithium alloy into a sheet, extrusion or rolling is carried out. The negative electrode may or may not include a current collector comprising a metal foil and a mesh.

Although the negative electrode may be formed entirely of the composite of the amorphous carbon material and the negative electrode active material, the amorphous carbon material does not have to be included in the portion other than the surface layer portion. The boundary between the surface layer portion comprising the composite and the lower layer portion not including the amorphous carbon material may be made clear, or the amount of the amorphous carbon material may be changed gradually in the thickness direction of the negative electrode. For example, a large amount of the amorphous carbon material may be distributed at the outermost surface of the surface layer portion, and the amorphous carbon material distribution may be decreased toward the inner side of the negative electrode with a gradient.

In the negative electrode as a whole, the amorphous carbon material content in the total of the negative electrode active material and the amorphous carbon material is preferably 5 wt % or less, and further preferably 0.02 wt % or more and 2 wt % or less. Such a degree of the amorphous carbon material content achieves obtaining the effects of stabilizing the interface between the negative electrode and the electrolyte, without decreasing the energy density of the negative electrode.

In the case where the boundary can be recognized between the surface layer portion comprising the composite of the negative electrode active material and the amorphous carbon material and the lower layer portion not including the amorphous carbon material, the thickness of the surface layer portion is preferably ⅓ or less, and further preferably ⅕ or more and 1/20 or less of the negative electrode thickness. Additionally, the amorphous carbon material content in the surface layer portion, that is, in the composite, is preferably 5 wt % or less, and further preferably 0.02 wt % or more and 2 wt % or less. Even the surface layer portion thickness of ⅓ or less of the negative electrode thickness is sufficient for controlling the interface between the negative electrode and the electrolyte. By making the surface layer portion comprising the composite thin, excessive electrolyte decomposition reaction is curbed. Particularly for the discharge with a weak current, the surface layer portion is preferably made thin. When graphite fluoride is used for the positive electrode, particularly, the voltage decline in the early stage of discharge is notable, and the discharge voltage increases as the discharge is advanced. Therefore, making the surface layer portion comprising the composite thin improves performance effectively in the early stage of discharge.

At a predetermined depth of the negative electrode, in a range of 5 nm to 15 nm from the surface thereof facing the positive electrode, halogen atoms, lithium atoms, and oxygen atoms are preferably present. When the composition is measured by XPS at such a depth, the molar ratio of halogen atoms to lithium atoms, i.e., X/Li, is preferably 0.7 or less. The molar ratio of halogen atoms to oxygen atoms, i.e., X/O, is preferably 1.3 or less. In this case, the effects of stabilizing the interface between lithium and the electrolyte can be obtained.

The amorphous carbon material is preferably microparticles comprising primary particles with the average particle size (median size) of 0.1 μm or less, and further preferably 0.03 μm or more and 0.1 μm or less, in view of homogenously distributing the amorphous carbon material in the proximity of the active portion at the lithium surface. Additionally, the amorphous carbon material is preferably microparticles with a BET specific surface area of 20 m$^2$/g or more, and further preferably of 50 m$^2$/g or more and 100 m$^2$/g or less, by for example nitrogen adsorption, in view of allowing a quick reaction with the electrolyte solvent. Also, the amorphous carbon material is preferably covered with a carbon material on at least 50% or more of the surface thereof. That is, when the area of the negative electrode surface facing the positive electrode is defined as S, the area of the negative electrode surface covered with the carbon material is defined as Sc, and the coverage rate is defined as Rs=(Sc/S)×100(%), Rs is preferably 50% or more.

By covering 50% or more of the negative electrode surface facing the positive electrode with the carbon material (by controlling the coverage rate to 50% or more (preferably 50 to 90%)), the condition at the interface between the negative electrode and the electrolyte can be controlled well. Coverage rate Rs can be determined, for example, by using a microscope with the field of view that enables observing the negative electrode surface facing the positive electrode entirely. In the image of the surface observed or photographed with a microscope, the ratio of the area shielded with the carbon material relative to the area of the negative electrode facing the positive electrode is the coverage rate. The surface image is observed or photographed in the vertical direction to the negative electrode surface facing the positive electrode.

The amorphous carbon material includes carbon black, activated carbon, coke, and glass-state carbon (glassy carbon). The amorphous carbon material may be used singly, or may be used in combination of two or more. Among these, carbon black is particularly preferable since micro-particulate, and high specific surface area one can be obtained easily. For carbon black, acetylene black, ketjen black, contact black, furnace black, and lamp black may be used. These carbon blacks may be used singly, or may be used in combination of two or more. Since carbon black is microparticles, its primary particles may be coagulated to form secondary particles. Carbon black is preferably dried with a hot blast of 150° C. to 250° C. or used after drying under reduced pressure for removing volatile components and adsorbed water.

In the following, an example is shown for a method for preparing a negative electrode including:

at least a surface layer portion comprising a composite of a negative electrode active material and an amorphous carbon material, the negative electrode active material comprising at least one selected from the group consisting of a lithium metal and a lithium alloy.

Firstly, a step that can be mentioned is a step of preparing a mixture including an amorphous carbon material and a negative electrode active material, and molding the mixture into a predetermined form of a negative electrode. This method is suitable when the entire or substantially entire negative electrode is formed from the composite of the amorphous carbon material and the negative electrode active material.

Secondly, a step that can be mentioned is a step of preparing a mixture including an amorphous carbon material and a negative electrode active material, rolling the mixture to form a thin sheet, and attaching the obtained mixture sheet to a lithium metal or lithium alloy sheet by pressure. A negative electrode plate can be obtained by cutting or punching the obtained pressure-attached sheet into a desired form. This method is suitable when forming a two-layered negative electrode plate including a surface layer portion comprising a composite of an amorphous carbon material and a negative electrode active material, and a lower layer portion comprising a negative electrode active material.

Thirdly, a step that can be mentioned is a step of preparing a paste including an amorphous carbon material, a binder, and an organic solvent, applying the paste on a lithium metal or lithium alloy sheet and then drying, and rolling the thin film and the sheet simultaneously. This method is also suitable when a two-layered negative electrode plate including a surface layer portion comprising a composite of an amorphous carbon material and a negative electrode active material, and a lower layer portion comprising a negative electrode active material.

Fourthly, a step that can be mentioned is a step of spraying an amorphous carbon material on a surface of a lithium metal or lithium alloy sheet, and then rolling the sprayed amorphous carbon material and the sheet simultaneously. By heating the lithium metal or lithium alloy sheet before the rolling, a surface layer portion comprising a composite of an amorphous carbon material and a negative electrode active material is formed easily. The suitable heating temperature is 100 to 200° C. This method is suitable when the surface layer portion comprising a composite of the amorphous carbon material and the negative electrode active material is to be formed thin.

The manufacturing steps for the negative electrode as in the above are preferably carried out in an argon gas atmosphere or under reduced pressure of 100 Pa or less. These steps can also be carried out in a rare gas atmosphere other than argon. Such an atmosphere prevents advancement of oxidation-reduction reaction between carbon black and lithium metal, and production of lithium nitride.

An example of a method for preparing a negative electrode for coin-type batteries is given in detail. In an argon glove box, dry carbon black is sprayed on a lithium metal sheet, and the sheet is heated to about 200° C. with a hot plate. At that time, carbon black is impregnated with melted lithium to form a composite of carbon black and lithium. Also, carbon black may be sandwiched with a pair of lithium metal sheets, and heated to about 200° C. The heating is preferably carried out under reduced pressure of 100 Pa or less, for accelerating the impregnation of carbon black with melted lithium. Further, a molten mixture is made by heating lithium sheet pieces and carbon black powder, and these were stirred in an inert atmosphere to accelerate homogenous mixing.

Then, with a small roller press device set in the inert atmosphere, the composite of lithium and carbon black is pressed into a sheet, and the thickness of the sheet is made uniform. When the thickness of the lithium metal is small, for example 100 μm or less, the sheet to which carbon black is sprayed and the sheets sandwiching carbon black may be rolled with a roller press device without melting by heat. By cutting the sheet having the predetermined thickness with a punching die to give a predetermined form, a negative electrode can be obtained. The obtained negative electrode is attached to the inner side of the case by pressing.

The negative electrode with the above characteristic (c) can be obtained by, for example, molding a lithium metal or a lithium alloy into a sheet-form or electrode-form, and then attaching or pressing in microparticles to the surface of the obtained sheet or molded body. Upon molding the lithium metal or lithium alloy into a sheet-form, for example, extrusion and rolling are carried out. The negative electrode may or may not include a current collector comprising a metal foil or a mesh.

The microparticles preferably have a higher degree of hardness than lithium and lithium oxide, in view of easily embedding the microparticles to the lithium metal surface or the lithium alloy surface. However, the hardness is sufficient if the microparticles can be pressed into the lithium metal or the lithium alloy by breaking the surface layer of lithium oxide. For microparticles, for example, ceramics, a lithium compound, and a carbon material may be used. These may be used singly, or may be used in combination of two or more.

For the ceramics, $Al_2O_3$, $Fe_2O_3$, SiC, $SiO_2$, and $ZrO_2$ may be used. These ceramics may be used singly, or may be used in combination of two or more. These ceramics have enough hardness to be easily pressed into the lithium or lithium alloy surface, and are less reactive with lithium. Additionally, these ceramics are stable in lithium batteries, and those ceramics with an appropriate particle size can be easily obtained.

For the lithium compound, $Li_3PO_4$ and $Li_2SO_4$ may be used. These may be used singly, or may be used in combination of two or more. These lithium compounds are preferable in that they are stable to lithium and organic electrolytes.

For the carbon material, graphite, petroleum coke, and activated carbon may be used. These may be used singly, or may be used in combination of two or more. When the carbon material that forms a distinctive intercalational compound with lithium, such as graphite, is embedded to the lithium surface, graphite particles turn red in a few hours. When these graphite particles are allowed to stand for about 12 hours in a dry air atmosphere, the intercalational compound of gold to red is formed on the lithium surface. Although such a clear change cannot be observed in the case of coke, activated carbon, and carbon black, similarly, a reaction with lithium is probably occurring. Lithium reacted with carbon material is deintercalated from the carbon material at the time of discharge reaction. Therefore, when a carbon material is used as microparticles, in addition to the increase in the lithium dissolution amount due to the carbon material embedding, the lithium desorption reaction can be utilized. As a result, the effects of decreasing the reaction overvoltage increase.

Among the carbon materials, when the following carbon materials are used, the effects of curbing an increase in battery internal resistance can be obtained as well: (i) carbon particles comprising primary particles with an average particle size (median size) of 0.1 μm or less; (ii) carbon particles with a BET specific surface area of 20 $m^2$/g or more by a nitrogen adsorption method; and (iii) at least one carbon black selected from the group consisting of acetylene black, ketjen black, contact black, furnace black, and lamp black. The increase in internal resistance can be curbed because the carbon material fixed on lithium has the same potential with lithium. That is, when the carbon material fixed on the lithium contacts electrolyte, intercalation of lithium ion and decomposition reaction of solvent immediately occur, and the lithium surface is covered with a decomposition product of the electrolyte. This decomposition product works as a protective layer to curb the electrolyte decomposition reaction at lithium/electrolyte interface. Therefore, the increase in battery internal resistance is curbed afterwards. Especially under low temperature environment, the increase in the battery internal resistance is greatly curbed. As a result, the improvement effects on the voltage drop at large current discharge become notable.

Although the amount of microparticles to be added to the surface layer portion of the negative electrode depends on the kind of the microparticles and the negative electrode form, and therefore cannot be generalized and there are no particular limitations, the amount of microparticles to be added to the surface layer portion of the negative electrode is preferably 0.1 to 50 g per unit surface area, i.e., $m^2$, for example. Such a degree of microparticle amount does not greatly decline the negative electrode energy density, and the resistance caused by the microparticles does not greatly affect discharge performance.

In the present invention, the average particle size (median size) of the primary particles of the microparticles is 2 μm or less, and further preferably 0.5 μm or less, so that the proportion of the negative electrode surface to which microparticles are not embedded (the surface facing the positive electrode) becomes small. When the average particle size of the microparticles exceeds 2 μm, proportion of the negative electrode surface to which microparticles are not embedded becomes large, failing to achieve sufficient effects of curbing the polarization at the early stage of discharge.

The maximum particle size of the microparticles are preferably 5 μm or less. When large particles with the particle size of 5 μm or more are mixed in, it becomes difficult to attach microparticles by pressing around the particles with such size, and may cause the proportion of the negative electrode surface to which microparticles are not embedded to become large. Therefore, the microparticles preferably have the average particle size of 2 μm or less, and have a sharp particle size distribution as much as possible. In view of the above, carbon black, which has primary particles with the average particle size (median size) of 0.1 μm or less, is preferable for the microparticles. Carbon black is preferably used after drying with a hot blast of 150 to 250° C. or drying under reduced pressure to remove volatile components and adsorbed water.

Although microparticles are preferably embedded to the surface layer portion of the negative electrode in a state of primary particles, secondary particles may be used as well in the case of the microparticles which easily form secondary particles by coagulation of primary particles, such as carbon black.

In the following, an example is shown for a method for preparing a negative electrode for coin-type batteries.

First, volatile components and adsorbed water are removed, when these are included in the microparticles. To be more specific, the microparticles are dried with a hot blast of 100 to 200° C. (150 to 250° C. in the case of carbon black) or dried under reduced pressure. Afterwards, the microparticles are sprayed on the lithium metal or lithium alloy sheet surface. Then, by rolling the sheet with such a weak pressure that does not change the original thickness of the sheet, with a release paper such as a polyethylene film interposed therebetween, microparticles are embedded to the sheet surface layer portion. Afterwards, the release paper is peeled off to remove the microparticles that were not embedded to the sheet surface layer portion. By punching the sheet to which the microparticles were embedded to the surface layer portion with a punching die to give a predetermined size, a desired negative electrode is obtained. The obtained negative electrode is attached to the inner side of the case of the coin-type battery by pressure.

The above method is merely an example, and the negative electrode may be prepared with other various methods. For example, microparticles may be embedded by attaching a lithium metal or lithium alloy of a predetermined form by pressure in advance to the inner side of the case, and afterwards, spraying dried microparticles on the lithium metal or lithium alloy surface. Or, a dispersion may be prepared by dispersing dried microparticles in a solvent such as propylene carbonate and 1,2-dimethoxyethane. This dispersion is applied on a film such as a polyester film and dried, and afterwards, transferred to the lithium metal or lithium alloy sheet surface.

The manufacturing step of the negative electrode such as the above is preferably carried out in an argon gas atmosphere or in an atmosphere of a reduced pressure of 100 Pa or less. The step also can be carried out in a rare gas atmosphere other than argon. This is because in such an atmosphere, advancement of oxidation-reduction reaction between microparticles and lithium, and generation of lithium nitride can be prevented.

Although there is no particular limitation on positive electrodes, the positive electrode includes, for example, a positive electrode active material, a conductive material, and a binder. The present invention is to improve discharge performance at the early stage of discharge by curbing the negative electrode overvoltage, and therefore the positive electrode active material is not particularly limited.

For the positive electrode active material, for example, a metal oxide and graphite fluoride may be used. The metal oxide and graphite fluoride may be used in combination. The metal oxide used for the positive electrode active material includes manganese dioxide and copper oxide. For graphite fluoride, graphite fluoride represented by the chemical formula $CF_x$ ($0.8 \leq x \leq 1.1$) may be used preferably. Graphite fluoride is excellent in terms of long-term reliability, safety, and high temperature stability. Graphite fluoride is obtained by fluorinating petroleum coke and artificial graphite.

For the conductive material of the positive electrode, for example, carbon black such as acetylene black and ketjen black, and graphite such as artificial graphite may be used. These may be used singly, or may be used in combination of two or more.

For the positive electrode binder, for example, fluorocarbon resins such as polytetrafluoroethylene (PTFE), polyvinylidene fluoride (PVDF), modified PVDF, tetrafluoroethylene-hexafluoropropylene copolymer (FEP), tetrafluoroethylene-perfluoroalkylvinylether copolymer (PFA), vinylidene fluoride-hexafluoropropylene copolymer, vinylidene fluoride-chlorotrifluoroethylene copolymer, ethylene-tetrafluoroethylene copolymer (ETFE resin), vinylidene fluoride-pentafluoropropylene copolymer, propylene-tetrafluoroethylene copolymer, ethylene-chlorotrifluoroethylene copolymer (ECTFE), and vinylidene fluoride-hexafluoropropylene-tetrafluoroethylene copolymer; styrene butadiene rubber (SBR); modified acrylonitrile rubber; and ethylene-acrylic acid copolymer may be used. These may be used singly, or may be used in combination of two or more.

For the organic electrolyte, a non-aqueous solvent that dissolves the solute may be used. To the electrolyte, a few percentage of vinylene carbonate, vinylethylene carbonate, ethylene sulfite, and dimethylsulfone may be added as an additive.

For the solute, lithium hexafluorophosphate ($LiPF_6$), lithium tetrafluoroborate ($LiBF_4$), lithium trifluoromethanesulfonate ($LiCF_3SO_3$), and lithium bis-pentafluoroethylsulfonate imide ($LiN(SO_2C_2F_5)_2$) may be used. These may be used singly, or may be used in combination of two or more.

For the non-aqueous solvent, cyclic carbonic acid ester such as γ-butyrolactone (γBL), γ-valerolactone (γVL), propylene carbonate (PC), and ethylene carbonate (EC); 1,2-dimethoxyethane (DME), 1,2-diethoxyethane (DEE), 1,3-dioxolane, dimethyl carbonate (DMC), diethyl carbonate (DEC), ethyl methyl carbonate (EMC), N,N-dimethylformamide, tetrahydrofuran, 2-methyltetrahydrofuran, dimethylsulfoxide, formamide, acetamide, dimethylformamide, dioxolane, acetonitrile, propylnitrile, nitromethane, ethylmonoglyme, trimethoxyymethane, dioxolane derivative, sulfolane, methylsulfolane, propylene carbonate derivative, and tetrahydrofuran derivative may be used. These may be used singly, or may be used in combination of two or more. Among these, γ-butyrolactone (γ-BL) is especially preferable in that it is stable under a wide range of temperature and easily dissolves the solute. However, in view of improving ion conductivity at low temperature, it is preferable that 1,2-dimethoxyethane (DME), which is a low-boiling point solvent, is mixed with γ-BL and used. Additionally, when the non-aqueous solvent includes γ-BL, $LiBF_4$ is preferably used as the solute. When γ-butyrolactone and other solvents are used in combination, the proportion of γ-butyrolactone relative to the whole non-aqueous solvent is preferably 50 wt % or more.

The separator material may be a material resistant to the internal environment of the lithium primary battery, for example, a polypropylene-made nonwoven fabric, a polyphenylene sulfide-made nonwoven fabric, and a polyolefin resin (polyethylene, polypropylene, and the like)-made microporous film may be used.

In the following, the present invention is described in detail based on Examples, but the Examples below are not to limit the present invention.

In Examples and Comparative Examples, a coin-type battery 10 as shown in FIG. 1 was made. The coin-type battery 10 includes a disk-form positive electrode 4, a disk-form negative electrode 5, and a separator 6 of polypropylene nonwoven fabric interposed between the positive electrode 4 and the negative electrode 5. The positive electrode 4 is placed on the inner bottom face of a positive electrode case 1 of stainless steel. The negative electrode 5 is attached to the inner face of a negative electrode case 2 of stainless steel by pressure. To a peripheral portion of the negative electrode case 2, an insulating packing 3 of polypropylene is attached. By crimping a peripheral end portion of the positive electrode case 1 to the insulating packing 3, the space storing the positive electrode 4, the negative electrode 5, the separator 6, and an organic electrolyte (not shown) is sealed. The positive electrode 4 and the negative electrode 5 are disposed to face each other with the separator 6 interposed therebetween.

EXAMPLE 1A (i) Preparation of Positive Electrode

For a positive electrode active material, petroleum coke was fluorinated and used as graphite fluoride. Graphite fluoride, acetylene black (conductive material), and styrene butadiene rubber (SBR)(binder) were blended in a solid content weight ratio of 100:15:6, and kneaded sufficiently by using a mixed solution of water and ethanol as a dispersion medium. After drying the obtained mixture at 100° C., by using a predetermined mold and a hydraulic press, the mixture was compression molded to give a disk-form, thereby obtaining a positive electrode.

(ii) Preparation of Negative Electrode

For a negative electrode active material, a lithium metal was used, and for an amorphous carbon material, acetylene black (AB) manufactured by Denki Kagaku Kogyo Kabushiki Kaisha was used. The average particle size of the primary particles of the acetylene black was 0.04 μm, and the BET specific surface area was 60 $m^2$/g. The acetylene black was dried at 120° C. under reduced pressure, and then introduced to a predetermined negative electrode preparation atmosphere. In other Examples and Comparative Examples as well, the amorphous carbon material was similarly dried under reduced pressure and then introduced to the negative electrode preparation atmosphere.

A lithium metal sheet with a thickness of 150 μm was cut to give an appropriate length, and the cut pieces were placed on a stainless steel-made vat and then introduced into an argon glove box (negative electrode preparation atmosphere). The dried acetylene black was sprayed on the cut pieces of lithium metal. Afterwards, the vat to which the cut pieces of lithium metal were put was placed on a hot plate, and heated for an hour at 200° C. to melt the lithium. A composite of lithium metal and acetylene black including 2 wt % of acetylene black was thus obtained. After cooling, three cut pieces that were integrated with acetylene black were stacked, and rolled with a small roller press device to give a thickness of 400 μm. The rolled composite was stamped into a disk-form with a die, thereby obtaining a negative electrode comprising a composite of lithium metal and acetylene black as a whole. The negative electrode was attached by pressure to the inner face of the negative electrode case with an insulating packing mounted thereon. The above processes were all carried out in an argon glove box.

(iii) Preparation of Organic Electrolyte

In γ-butyrolactone (γBL: non-aqueous solvent), lithium tetrafluoroborate ($LiBF_4$: solute) was dissolved at a concentration of 1 mol/L and used as an electrolyte.

(iv) Battery Assembly

A positive electrode was placed on the inner bottom face of a positive electrode case, and covered with a separator (thickness of 100 μm) of polypropylene nonwoven fabric stamped to give a circular shape. Afterwards, an electrolyte was injected into the positive electrode case, to impregnate the positive electrode and the separator with the electrolyte. Then, the negative electrode case to which the negative electrode was attached by pressure was attached to the positive electrode case, so that the negative electrode and the positive electrode face each other. The peripheral end portion of the positive electrode case was crimped to an insulating packing attached to the negative electrode case, to complete a sealed coin-type battery. The battery had a diameter of 20 mm, a height of 2 mm, and a designed capacity of 100 mAh. The above assembly processes were carried out in dry air with a dew point −50° C. or less. The same coin-type batteries were made to produce 12 batteries.

EXAMPLE 2A

A negative electrode was made in the same manner as Example 1A, except that the negative electrode preparation atmosphere was changed to an airtight container with a degree of vacuum of 100 Pa or less: 10 coin-type batteries were made.

EXAMPLE 3A

A negative electrode was made in the same manner as Example 1A, except that furnace black (FB) comprising primary particles with an average particle size of 0.1 μm and a BET specific surface area of 20 $m^2/g$ was used instead of acetylene black; and the furnace black content in the composite of lithium metal and furnace black was set to 5 wt %: 12 coin-type batteries were made.

EXAMPLE 4A

A negative electrode was made in the same manner as Example 1A, except that ketjen black (KB) comprising primary particles with an average particle size of 0.03 μm and a BET specific surface area of 800 $m^2/g$ was used instead of acetylene black, and the ketjen black content in the composite of lithium metal and ketjen black was set to 0.02 wt %: 12 coin-type batteries were made.

EXAMPLE 5A

A negative electrode was made in the same manner as Example 1A, except that carbon black (CB) comprising primary particles with an average particle size of 0.2 μm and a BET specific surface area of 18 $m^2/g$ was used instead of acetylene black; and the carbon black content in the composite of lithium metal and carbon black was set to 1 wt %: 10 coin-type batteries were made.

EXAMPLE 6A

A negative electrode was made in the same manner as Example 1A, except that activated carbon with an average particle size of 5 μm and a BET specific surface area of 1600 $m^2/g$ was used instead of acetylene black, and the activated carbon content in the composite of lithium metal and activated carbon was set to 0.5 wt %: 10 coin-type batteries were made.

EXAMPLE 7A

A negative electrode was made in the same manner as Example 1A, except that the negative electrode preparation atmosphere was changed to a dry nitrogen atmosphere (a dew point −50° C. or less): 10 coin-type batteries were made.

EXAMPLE 8A 10 coin-type batteries were made in the same manner as Example 1A, except that for the organic electrolyte, $LiCF_3SO_3$ (solute) was dissolved in a 1:1 (in volume ratio) mixed solution (non-aqueous solvent) of propylene carbonate (PC) and 1,2-dimethoxyethane (DME) with a concentration of 1 mol/L and used, and the acetylene black content in the composite of lithium metal and acetylene black was set to 0.1 wt %.

EXAMPLE 9A

A negative electrode was made in the same manner as Example 1A, except that the acetylene black content in the composite of lithium metal and acetylene black was set to 10 wt %: 10 coin-type batteries were made.

COMPARATIVE EXAMPLE 1A

Twelve coin-type batteries were made in the same manner as Example 1A, except that a lithium metal sheet was stamped into a disk-form without being integrated with carbon black, and used as is a negative electrode.

COMPARATIVE EXAMPLE 2A

A negative electrode was made in the same manner as Example 1A, except that artificial graphite with an average particle size of 2 μm and a BET specific surface area of 12 $m^2/g$ was used instead of acetylene black, and the artificial graphite content in a composite of lithium metal and artificial graphite was set to 5 wt %; and the negative electrode preparation atmosphere was changed to dry air atmosphere: 10 coin-type batteries were made.

EXAMPLE 10A

A positive electrode was obtained in the same manner as Example 1A, except that for the positive electrode active material, manganese dioxide ($MnO_2$) was used, and $MnO_2$, ketjen black (conductive material), and a fluorocarbon resin (binder: solid content of NEOFLON FEP manufactured by DAIKIN INDUSTRIES, LTD.) were blended in a weight ratio of 100:3:6. Ten coin-type batteries were made in the same manner as Example 1A, except that this positive electrode was used; $LiCF_3SO_3$ (solute) was dissolved in a 1:1 (volume ratio) mixed solution (non-aqueous solvent) of propylene carbonate (PC) and 1,2-dimethoxyethane (DME) with a concentration of 1 mol/L and used as the organic electrolyte; and the acetylene black content in a composite of lithium metal and acetylene black was set to 0.2 wt %.

EXAMPLE 11A

A negative electrode was made in the same manner as Example 4A, except that the ketjen black content in a composite of lithium metal and ketjen black was set to 0.1 wt %. Ten coin-type batteries were made in the same manner as Example 1A, except that this negative electrode was used; the same positive electrode as that of Example 10A was used; and $LiPF_6$ was dissolved in a 3:1 (volume ratio) mixed solution (non-aqueous solvent) of propylene carbonate (PC) and 1,3-dioxolane in a concentration of 1 mol/L and used as the organic electrolyte.

COMPARATIVE EXAMPLE 3A

Ten coin-type batteries were made in the same manner as Example 10A, except that a lithium metal sheet was stamped into a disk-form and used as is as a negative electrode, without integrating with carbon black.

[Evaluation]
(i) Initial Performance

A battery of each of Examples 1A to 11A and Comparative Examples 1A to 3A was preliminary discharged at a constant current of 4 mA for 30 minutes. Then, the batteries were aged at 60° C. for 1 day to stabilize the battery open circuit voltage (OCV). Afterwards, the OCV and impedance at 1 kHz were determined for each battery at ambient temperature, and no abnormality was confirmed in each battery.

(Discharge Capacity)

After aging, 2 batteries from each of Examples and Comparative Examples were discharged to 2 V with a constant resistance of 15 kΩ at 25° C., to check the initial discharge capacity ($C_0$).

(Large Current Discharge Performance at Low Temperature)

After aging, 3 batteries from each of Examples and Comparative Examples were pulse discharged −40° C., to evaluate large current discharge performance at low temperature. To be specific, the battery was discharged with a constant current of 3 mA for 1 second, and allowed to stand for 59 seconds: this pattern was repeated for 20 cycles, and a pulse voltage value for each cycle was determined. The lowest pulse voltage ($V_0$) in 20 cycles was obtained.

(ii) Performance after High Temperature Storage

After aging, 5 batteries from each of Examples and Comparative Examples were evaluated for stability at high temperature storage. Batteries from Examples 1A to 9A and Comparative Examples 1A and 2A were stored as is at 80° C. for 10 days after the aging. Batteries from Examples 10A and 11A, and Comparative Example 3A were discharged with a constant current of 0.1 mA for 500 hours (50 mAh), and stored for 10 days at 80° C. The reason why the batteries from Examples 10A and 11A, and Comparative Example 3A were partially discharged was that when $MnO_2$ was used as the positive electrode active material, notable deterioration can be observed by storing the battery at high temperature after a partial discharge.

(Discharge Capacity)

Of the batteries stored at 80° C. for 10 days, 2 batteries from each of Examples and Comparative Examples were discharged to 2 V with a constant resistance of 15 kΩ at 25° C., to check discharge capacity ($C_1$) after high temperature storage.

(Large Current Discharge Performance at Low Temperature)

Of the batteries stored at 80° C. for 10 days, 3 batteries from each of Examples and Comparative Examples were pulse discharged −40° C., to evaluate large current discharge performance at low temperature. To be specific, the battery was discharged with a constant current of 3 mA for 1 second, and allowed to stand for 59 seconds: this pattern was repeated for 20 cycles, and a pulse voltage value for each cycle was determined. The lowest pulse voltage ($V_1$) in 20 cycles was obtained.

Table 1 shows the average value of $C_0$, $V_0$, $C_1$, and $V_1$ in Examples 1A to 9A and Comparative Examples 1A and 2A, in which the positive electrode active material was graphite fluoride. Table 2 shows the average value of $C_0$, $V_0$, $C_1$, and $V_1$ in Examples 10A and 11A, and Comparative Example 3A, in which positive electrode active material was $MnO_2$.

TABLE 1

| | Amorphous Carbon Material | Average Particle Size (μm) | BET Specific Surface Area (m²/g) | Carbon Material Content (wt %) | Atmosphere | Initial Period | | After High Temperature Storage | |
|---|---|---|---|---|---|---|---|---|---|
| | | | | | | $C_0$ (mAh) | $V_0$ (V) | $C_1$ (mAh) | $V_1$ (V) |
| Ex. 1A | AB | 0.04 | 60 | 2 | Ar | 108 | 2.293 | 106 | 2.247 |
| Ex. 2A | AB | 0.04 | 60 | 2 | 100 Pa or less | 108 | 2.302 | 106 | 2.266 |
| Ex. 3A | FB | 0.1 | 20 | 5 | Ar | 106 | 2.287 | 104 | 2.238 |
| Ex. 4A | KB | 0.03 | 800 | 0.02 | Ar | 109 | 2.295 | 106 | 2.245 |
| Ex. 5A | CB | 0.2 | 18 | 1 | Ar | 107 | 2.261 | 105 | 2.210 |
| Ex. 6A | Activated Carbon | 5 | 1600 | 0.5 | Ar | 108 | 2.272 | 105 | 2.185 |
| Ex. 7A | AB | 0.04 | 60 | 2 | N2 | 101 | 2.259 | 99 | 2.192 |
| Ex. 8A | AB | 0.04 | 60 | 0.1 | Ar | 110 | 2.313 | 98 | 2.204 |

TABLE 1-continued

|  | Amorphous Carbon Material | Average Particle Size (μm) | BET Specific Surface Area (m²/g) | Carbon Material Content (wt %) | Atmosphere | Initial Period | | After High Temperature Storage | |
|---|---|---|---|---|---|---|---|---|---|
|  |  |  |  |  |  | $C_0$ (mAh) | $V_0$ (V) | $C_1$ (mAh) | $V_1$ (V) |
| Ex. 9A | AB | 0.04 | 60 | 10 | Ar | 98 | 2.213 | 96 | 2.018 |
| Comp. Ex. 1A | None | — | — | — | — | 106 | 2.188 | 100 | 1.921 |
| Comp. Ex. 2A | Artificial Graphite | 2 | 12 | 5 | Dry Air | 100 | 2.190 | 95 | 2.049 |

TABLE 2

|  | Amorphous Carbon Material | Average Particle Size (μm) | BET Specific Surface Area (m²/g) | Carbon Material Content (wt %) | Atmosphere | Initial Period | | After High Temperature Storage* | |
|---|---|---|---|---|---|---|---|---|---|
|  |  |  |  |  |  | $C_0$ (mAh) | $V_0$ (V) | $C_1$ (mAh) | $V_1$ (V) |
| Ex. 10A | AB | 0.04 | 60 | 0.2 | Ar | 105 | 2.312 | 46 | 2.185 |
| Ex. 11A | KB | 0.03 | 800 | 0.1 | Ar | 103 | 2.337 | 43 | 2.204 |
| Comp. Ex. 3A | None | — | — | — | — | 104 | 2.250 | 28 | 1.852 |

*Stored at 80° C. after discharging 50% of the designed capacity

[Consideration]
(i) Initial Performance

As is clear from Table 1, in any of Examples 1A to 8A, the lowest voltage in the pulse discharge −40° C. was greatly larger than 2.188 V in Comparative Example 1A. Therefore, it is clear that initial performance for large current discharge at low temperature was improved. Additionally, since discharge capacity at ambient temperature in Examples 1A to 8A exceeded the designed capacity (100 mAh), there was no adverse effects on other aspects of discharge performance.

On the other hand, from the comparison between Comparative Example 2A which used artificial graphite, i.e., crystalline carbon material, and Example 1A, it is clear that improvement effects on pulse discharge performance −40° C. became obvious by usage of the amorphous carbon material. This is probably because the reduction-deomposition reaction of the electrolyte at the interface between crystalline carbon material and the electrolyte was greater than the reduction-deomposition reaction of the electrolyte at the interface between the amorphous carbon material and the electrolyte, and reaction resistance at the interface formed by decomposition product was increased.

In Example 9A, in which the acetylene black content in the negative electrode was large, i.e., 10 wt %, although initial discharge capacity became lower than the designed capacity and the battery energy density declined, improvement effects were seen in the pulse discharge performance −40° C. The decline in initial discharge capacity is probably because of the large amount of acetylene black. That is, the degree of reduction-deomposition reaction of the electrolyte at the interface between acetylene black and the electrolyte became large, and reaction resistance at the interface formed by the decomposition product increased. Therefore, to improve low temperature discharge performance, the amorphous carbon material content is preferably set to 5 wt % or less.

In Example 7A, in which the integration of lithium metal and carbon black was carried out in a dry nitrogen atmosphere, initial capacity became 101 mAh, i.e., lower than that of Comparative Example 1A. Also, pulse discharge performance −40° C. in Example 7 was 2.259 V, and the improvement effects were less than that of Examples 1A to 6A and 8A, in which the integration was carried out in an argon atmosphere or under vacuum of 100 Pa or less. This is probably because the melted lithium and nitrogen reacted and lithium nitride ($Li_3N$) was formed in the integration process. $Li_3N$ reacts with a very small amount of water in dry air and a very small amount of water in the electrolyte at the time of battery assembly, and causes reactions of lithium hydroxide production and electrolyte decomposition. Based on these, it can be assumed that the electrolyte and the amount of lithium that can be discharged were decreased. Therefore, carbon black and lithium metal were preferably integrated in an argon atmosphere. Additionally, when carbon black and lithium metal were integrated in a reduced-pressure atmosphere of 100 Pa or less, impregnation of carbon black particles, which are porous and small in bulk density, with melted lithium is accelerated. Therefore, integration of lithium and carbon black becomes further easy.

In Examples 1A to 4A, in which amorphous carbon material includes primary particles with an average particle size of 0.1 μm or less and a BET specific surface area of 20 m²/g or more, no decline in initial discharge capacity was seen, and the lowest voltage in the pulse discharge −40° C. was about 2.3 V. That is, in Examples 1A to 4A, the lowest voltage in the pulse discharge −40° C. improved by 0.1 V or more than that of Comparative Example 1A, and the effects of curbing the voltage drop in the early stage of discharge were great.

When $MnO_2$ was used as the positive electrode active material, as shown in Table 2, initial discharge capacities of Examples 10A and 11A were almost the same as that of Comparative Example 3A. On the other hand, the pulse discharge voltage −40° C. in Examples 10A and 11A were 2.3 V or more, an improvement by about 0.05 V compared with 2.25 V in Comparative Example 3A. When $MnO_2$ was used as the positive electrode active material, since the electrolyte was different as well, the interface reaction of the negative electrode and the electrolyte, and polarization contribution degree of the positive and negative electrodes at low temperature discharge probably change. However, the results in Table 2 show that even when $MnO_2$ was used as the positive electrode active material, the same improvement effects as the case when graphite fluoride was used as the positive electrode active material can be obtained.

Figure 2:
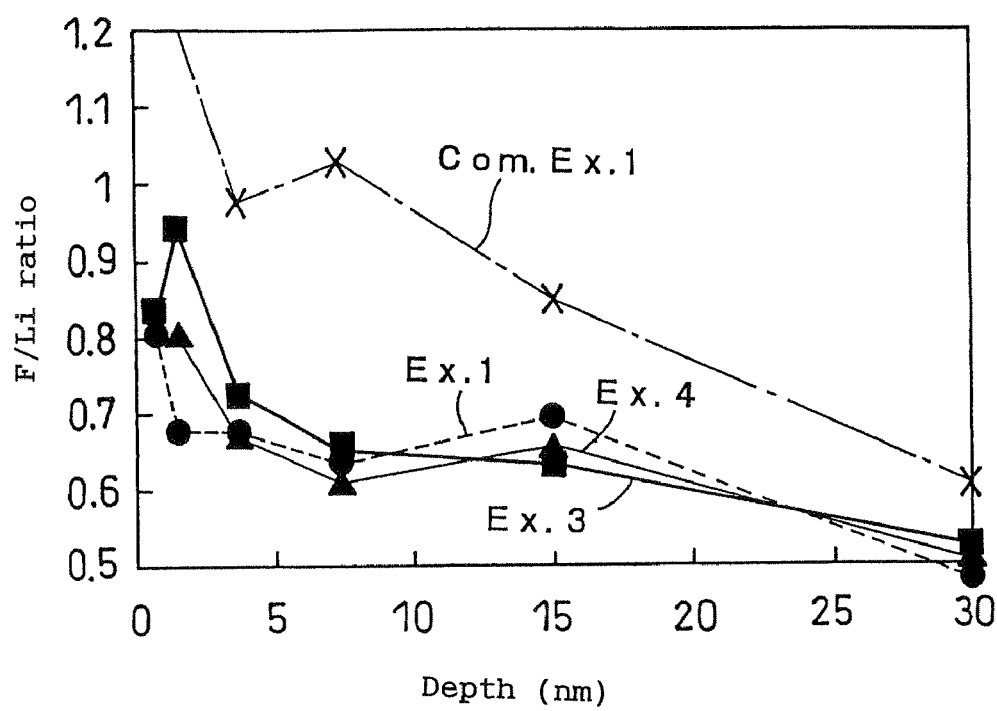
[FIG. 2] A graph showing the relationship between the depth of the negative electrode from the surface thereof facing the positive electrode and a molar ratio of fluorine atoms to lithium atoms, F/Li, detected by XPS.
Figure 3:
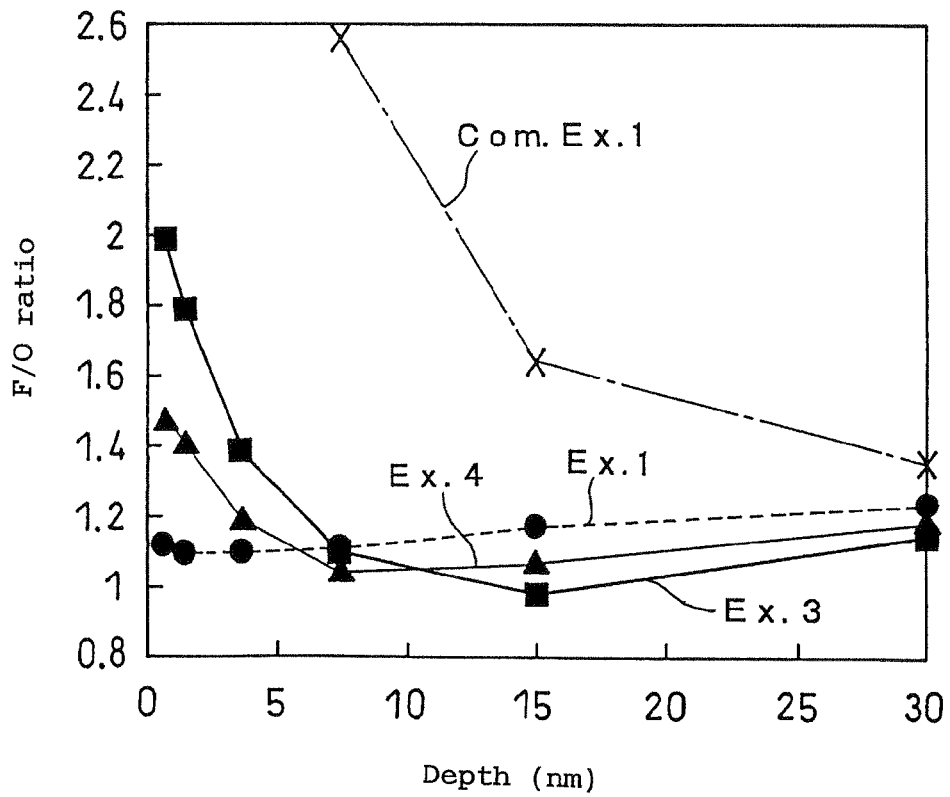
[FIG. 3] A graph showing the relationship between the depth of the negative electrode from the surface thereof facing the positive electrode and a molar ratio of fluorine atoms to oxygen atoms, F/O, detected by XPS.

Batteries after preliminary discharge in Examples 1A, 3A, and 4A, and Comparative Example 1A were disassembled in a dry atmosphere, and the negative electrodes were taken out. The negative electrodes taken out were washed with DME (1,2-dimethoxyethane), and XPS (X-ray photoelectron spectroscopy) analysis was carried out. For the analysis device, Model 5600 manufactured by Physical Electronics, Inc. was used, and for the X-ray light source, Al—Kα (14 kV/400W) was used. The etching was carried out by argon ion sputtering with an accelerating voltage of 3 kV. With such conditions, etching rate was 7.4 nm/min by $SiO_2$ conversion. The element and region to be measured were set to Li1s (65 to 45 eV), B1s (200 to 180 eV), C1s (294 to 274 eV), O1s (542 to 522 eV), and F1s (695 to 675 eV). XPS analysis was carried out after each etching, and the amount of the element that was present was determined from the peak area of each measurement element. The relationship between the depth of the negative electrode from the surface facing the positive electrode, and the molar ratio F/Li, i.e., the detected fluorine atoms relative to lithium atoms, is shown in FIG. 2. Also, the depth of the negative electrode from the surface facing the positive electrode, and the molar ratio F/O, the detected fluorine atoms to oxygen atoms, is shown in FIG. 3.

FIG. 2 shows that a large amount of fluorine atoms are present in the proximity of the negative electrode surface of Comparative Example 1A (Com. Ex. 1), and the amount of fluorine atoms present decreases toward the inner portion of the negative electrode. In the case of the negative electrode surface comprising only lithium metal in Comparative Example 1A, a comparatively large amount of lithium fluoride (LiF) was produced. LiF is thought to be produced by the decomposition reaction of solute ($LiBF_4$) and reaction between Li and fluorine ions that were fled from graphite fluoride, i.e., the positive electrode active material. On the other hand, in Example 1A (Ex. 1), Example 3A (Ex. 3), and Example 4A (Ex. 4), the amount of fluorine atoms present in the proximity of the negative electrode surface is smaller than that of Comparative Example 1A. Additionally, the molar ratio F/Li particularly at a depth of 5 to 15 nm from the surface is 0.7 or less, which shows that the production amount of LiF was small.

Oxygen atoms in the proximity of the negative electrode surface are present mainly as lithium oxide ($Li_2O$), and as lithium carbonate ($Li_2CO_3$), which is a decomposition product of the solvent. The amount of oxygen atoms present decreases toward the inner portion of the negative electrode. It is clear from FIG. 3 that in the proximity of the negative electrode surface of the Comparative Example 1A (Com. Ex. 1), the amount of fluorine atoms (LiF) that are present is two or three times the oxygen atoms. On the other hand, in Example 1A (Ex. 1), Example 3A (Ex. 3), and Example 4A (Ex. 4), the amount of fluorine atoms that are present in the proximity of the negative electrode surface is 1 to 1.5 times the amount of oxygen atoms. The molar ratio F/O especially at a depth of 5 to 15 nm from the surface is 1.3 or less. This shows that from the negative electrode surface to a depth of 5 to 15 nm, lithium oxide and lithium carbonate are present in a large amount, producing only a small amount of LiF.

As described above, the effect of the present invention relates to making the amount of oxygen atoms present in the proximity of the negative electrode surface large (especially at 5 to 15 nm from the surface), and to decreasing the amount of fluorine atoms present. By increasing the amount of the oxygen atoms present, and by decreasing the amount of fluorine atoms present, a stable interface between lithium and electrolyte can be formed at the time of high temperature storage, and large current discharge performance after high temperature storage or large current discharge performance at low temperature can be improved.

Effects of the present invention are to decrease the reaction resistance of the negative electrode, and to improve discharge voltage at low temperature discharge, by controlling the interface reaction of the negative electrode and the electrolyte. Therefore, as long as the solid positive electrode active material is used, the effects of the present invention are not greatly different, and the same effects can be obtained even by using various oxides and fluorides.

(ii) Performance after High Temperature Storage

With regard to discharge capacity after high temperature storage, since in any of Examples 1A to 7A of the present invention, the capacity same as that of Comparative Example 1A, i.e., 100 mAh, or more remained, capacity deterioration by high temperature storage was less. However, in Comparative Example 2A, in which artificial graphite, i.e., crystalline carbon material, was used, the capacity was 95 mAh, and deterioration by high temperature storage was great.

Additionally, regarding pulse performance at a low temperature −40° C., Comparative Example 1A showed a drop to 1.92 V, whereas any of Examples 1A to 9A and Comparative Example 2A showed 2 V or more, achieving the effects of improvement in low temperature discharge performance after high temperature storage. Especially in Examples 1A to 8A, a high discharge voltage of 2.1 V or more was obtained. Among them, in Examples 1A to 4A, in which carbon black comprised primary particles with an average particle size of 0.1 μm or less and a BET specific surface area of 20 $m^2$/g or more, discharge voltage was about 2.25 V, and improvement effects of discharge performance were notably obtained.

Regarding the effects from the electrolyte, in Example 8A, in which $LiCF_3SO_3$ was dissolved in a solvent mixture of PC and DME, initial pulse discharge voltage −40° C. was 2.313 V, i.e., 0.02 V higher than that of Example 1A, in which $LiBF_4$ was dissolved in γBL. After storage at 80° C., both discharge capacity and pulse discharge voltage −40° C. in Example 8A became lower than that of Example 1A. The battery after storage in Example 8A was a little swollen, probably because the gas generation from high temperature storage became greater, and the capacity deterioration and low temperature pulse performance deterioration were great. Therefore, it was made clear that usage of the electrolyte in which $LiBF_4$ was dissolved in γBL is advantageous in obtaining lithium primary batteries excellent in stability and storage characteristics at high temperature.

In battery after storage at 80° C. in Comparative Example 3A, only 28 mAh was discharged, i.e., about a half of the remaining capacity (50 mAh), whereas in batteries in Examples 10A and 11A, discharge capacities of 46 mAh, and 43 mAh were obtained, respectively. Further, in pulse discharge −40° C. after storage at 80° C. as well, the drop was large in Comparative Example 3A, i.e., to 1.85 V, whereas in Examples 10A and 11A, the voltage drop were 2.185 V and 2.204 V, respectively, showing a great improvement in storage characteristics at high temperature. Therefore, even in the case where oxides were used for the positive electrode active material, by using the negative electrode integrated with amorphous carbon material of the present invention, interface reactions between the negative electrode and the electrolyte were controlled, and the effects of curbing the increase in reaction resistance of the negative electrode can be obtained, and storage characteristics at high temperature can be greatly improved.

As a result of AC impedance measurement for each battery, in any of the batteries using the negative electrode integrated with carbon material in Examples and Comparative Examples, an arc portion became smaller than that of batteries using the negative electrode comprising a simple substance of lithium in Comparative Examples 1A and 3A. This is probably because the reaction resistance at the interface between the negative electrode and the electrolyte became small. However, since correlation between the reaction resistance value estimated from the diameter of the reaction arc obtained by Cole-Cole plot, and the lowest voltage in pulse discharge −40° C. was unclear, the effects of improvement in discharge performance could not be estimated from AC impedance measurement results. Correlation between the results of AC impedance in batteries after storage at 80° C. and discharge performance was also similar.

EXAMPLE 12A

A composite of lithium metal and acetylene black was obtained from cut pieces of a lithium metal sheet with a thickness of 150 μm in the same manner as Example 1A, except that the acetylene black (AB) content was set to 0.2 wt %. After cooling, the cut pieces integrated with acetylene black, and a lithium metal sheet with a thickness of 250 μm were stacked, and rolled with a rolling mill to give a thickness of 350 μm. The rolled product was stamped into a disk-form with a die, to obtain a negative electrode comprising a surface layer portion of the composite and a lower layer portion of lithium metal. The obtained negative electrode was cooled with a liquid nitrogen, and then cut in the direction of thickness to observe the cut surface. As a result, the thickness of the surface layer portion was about 110 to 120 μm. The coin-type batteries were made in the same manner as Example 1A, except that the obtained negative electrode was used.

Figure 4:
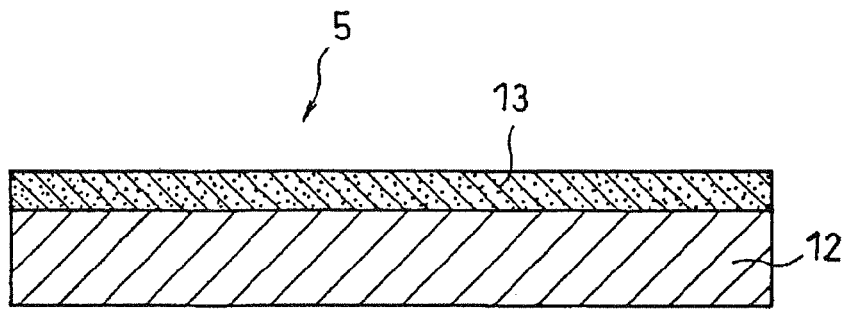
[FIG. 4] A schematic cross sectional view of an example of the negative electrode of the present invention.

FIG. 4 shows a schematic cross sectional view of the obtained negative electrode 5. The negative electrode 5 comprises a surface layer portion 13 comprising a composite of acetylene black and lithium metal, and a lower layer portion 12 of a simple substance lithium metal.

EXAMPLE 13A

A composite of lithium metal and furnace black was obtained in the same manner as Example 1A, except that the negative electrode preparation atmosphere was changed to a reduced-pressure atmosphere of a degree of vacuum of 100 Pa or less; the thickness of cut pieces of the lithium metal sheet was changed to 360 μm; furnace black (FB) comprising primary particles with an average particle size of 0.1 μm and a BET specific surface area of 20 m$^2$/g was used instead of acetylene black; and a heating temperature of the cut pieces to which furnace black was sprayed on surface thereof was set to 150° C. After cooling, the cut pieces integrated with furnace black were rolled with a rolling mill to give a thickness of 350 μm, and stamped into a disk-form with a die, to obtain a negative electrode. As a cross section of the obtained negative electrode was observed, it was found that the thickness of the surface layer portion where furnace black was present was about 10 to 15 μm. When the thickness was assumed as 15 μm, the furnace black content in the surface layer portion was 5 wt %. Ten coin-type batteries were made in the same manner as Example 1A, except that this negative electrode was used.

EXAMPLE 14A

A composite of lithium metal and carbon black was obtained in the same manner as Example 1A, except that the negative electrode preparation atmosphere was changed to a reduced-pressure atmosphere of a degree of vacuum of 100 Pa or less; the thickness of the lithium metal sheet was changed to 100 μm; carbon black (CB) comprising primary particles with an average particle size of 0.2 μm and a BET specific surface area of 18 m$^2$/g was used instead of acetylene black; and the carbon black content was changed to 1 wt %. After cooling, the cut pieces integrated with carbon black were rolled with a rolling mill to a give thickness of 70 μm, and stacked with the lithium metal sheet with a thickness of 280 μm, and stamped into a disk-form with a die, to obtain a negative electrode comprising a surface layer portion of the composite and a lower layer portion of lithium metal. Ten coin-type batteries were made in the same manner as Example 1A, except that the obtained negative electrode was used.

EXAMPLE 15A

A composite of lithium metal and carbon black was obtained in the same manner as Example 1A, except that the negative electrode preparation atmosphere was changed to a reduced-pressure atmosphere of a degree of vacuum of 100 Pa or less; the thickness of the lithium metal sheet was changed to 30 μm; carbon black (CB) comprising primary particles with an average particle size of 0.04 μm and a BET specific surface area of 50 m$^2$/g was used instead of acetylene black; and the carbon black content was set to 0.02 wt %. After cooling, the cut pieces integrated with carbon black were stacked with a lithium-aluminum alloy having a thickness of 320 μm and including 1 wt % of Al, and stamped into a disk-form with a die, to obtain a negative electrode comprising a surface layer portion of the composite and a lower layer portion of lithium alloy. Ten coin-type batteries were made in the same manner as Example 1A, except that the obtained negative electrode was used.

EXAMPLE 16A

A negative electrode was made in the same manner as Example 14A, except that activated carbon with an average particle size of 5 μm and a BET specific surface area of 1600 m$^2$/g was used instead of carbon black; and the activated carbon content in the composite of lithium metal and activated carbon was set to 2 wt %: 10 coin-type batteries were made.

EXAMPLE 17A

A negative electrode was made in the same manner as Example 14A, except that the negative electrode preparation atmosphere was changed to a dry nitrogen atmosphere (a dew point −50° C. or less): 10 coin-type batteries were made.

EXAMPLE 18A

A negative electrode was made in the same manner as Example 12A, except that the acetylene black content included in the surface layer portion was set to 10 wt %, and the thickness of the surface layer portion was set to about 200 μm (the thickness of the entire negative electrode was 350 μm): 10 coin-type batteries were made.

COMPARATIVE EXAMPLE 4A

A negative electrode was made in the same manner as Example 12A, except that artificial graphite with an average particle size of 2 μm and a BET specific surface area of 12 m²/g was used instead of acetylene black; the artificial graphite content in the surface layer portion was set to 1 wt %; and the negative electrode preparation atmosphere was changed to a dry air atmosphere: 10 coin-type batteries were made.

EXAMPLE 19A

Ten coin-type batteries were made in the same manner as Example 12A, except that the same positive electrode as Example 10A and the same organic electrolyte as Example 10A were used.

EXAMPLE 20A

A negative electrode was made in the same manner as Example 14A, except that ketjen black with an average particle size of 0.03 μm and a BET specific surface area of 800 m²/g was used instead of carbon black with an average particle size of 0.2 μm and a BET specific surface area of 18 m²/g. Ten coin-type batteries were made in the same manner as Example 19A, except that this negative electrode and the same organic electrolyte as in Example 11A was used.

COMPARATIVE EXAMPLE 5A

Ten coin-type batteries were made in the same manner as Example 19A, except that a lithium metal sheet as is was stamped into a disk-form and used as the negative electrode without integrating with carbon black.
[Evaluation]
(i) Initial Performance
A battery of each of Examples 12A to 20A and Comparative Examples 4A to 5A was preliminary charged at a constant current of 4 mA for 30 minutes. Then, the batteries were aged at 60° C. for 1 day, to stabilize the battery open circuit voltage (OCV). Afterwards, the OCV and impedance at 1 kHz were determined for each battery at ambient temperature, and no abnormality was confirmed in each battery.
(Discharge Capacity)
After aging, 2 batteries from each of Examples and Comparative Examples were discharged to 2 V with a constant resistance of 15 kΩ at 25° C., to check the initial discharge capacity ($C_0$).

(Large Current Discharge Performance at Low Temperature)
After aging, 3 batteries from each of Examples and Comparative Examples were pulse discharged −40° C., to evaluate large current discharge performance at low temperature. To be specific, the battery was discharged with a constant current of 3 mA for 1 second, and allowed to stand for 59 seconds: this pattern was repeated for 20 cycles, and a pulse voltage value for each cycle was determined. The lowest pulse voltage ($V_0$) in 20 cycles was obtained.
(ii) Performance After High Temperature Storage
After aging, 5 batteries from each of Examples and Comparative Examples were evaluated for stability at high temperature storage. Batteries in Examples 12A to 18A and Comparative Example 4A were stored as is for 10 days at 80° C. after aging. Batteries in Examples 19A and 20A, and Comparative Example 5A were discharged at a constant current of 0.1 mA for 500 hours (50 mAh), and then stored at 80° C. for 10 days. Batteries in Examples 19A and 20A, and Comparative Example 5A were partially discharged because when $MnO_2$ was used as the positive electrode active material, notable decline can be seen by high temperature storage after partial discharge.
(Discharge Capacity)
Of the batteries stored at 80° C. for 10 days, 2 batteries from each of Examples and Comparative Examples were discharged to 2 V with a constant resistance of 15 kΩ at 25° C., to check discharge capacity ($C_1$) after high temperature storage.
(Large Current Discharge Performance at Low Temperature)
Of the batteries stored at 80° C. for 10 days, 3 batteries from each of Examples and Comparative Examples were pulse discharged −40° C., to evaluate large current discharge performance at low temperature. To be specific, the battery was discharged with a constant current of 3 mA for 1 second, and allowed to stand for 59 seconds: this pattern was repeated for 20 cycles, and a pulse voltage value for each cycle was determined. The lowest pulse voltage ($V_1$) in 20 cycles was obtained.

Table 3 shows the average value of $C_0$, $V_0$, $C_1$, and $V_1$ in Examples 12A to 18A and Comparative Example 4A, in which the positive electrode active material is graphite fluoride. Table 4 shows the average value of $C_0$, $V_0$, $C_1$, and $V_1$ in Examples 19A and 20A, and Comparative Example 5A, in which the positive electrode active material is $MnO_2$.

TABLE 3

| | Amorphous Carbon Material | Average Particle size (μm) | BET Specific Surface Area (m²/g) | Carbon Material Content (wt %) | Surface Layer Portion Thickness Ratio (%) | Atmosphere | Initial Period | | After High Temperature Storage | |
|---|---|---|---|---|---|---|---|---|---|---|
| | | | | | | | $C_0$ (mAh) | $V_0$ (V) | $C_1$ (mAh) | $V_1$ (V) |
| Ex. 12A | AB | 0.04 | 60 | 0.2 | 34 | Ar | 108 | 2.298 | 106 | 2.257 |
| Ex. 13A | FB | 0.1 | 20 | 5 | 4 | 100 Pa or less | 105 | 2.291 | 103 | 2.266 |
| Ex. 14A | CB | 0.2 | 18 | 1 | 20 | 100 Pa or less | 106 | 2.267 | 104 | 2.238 |
| Ex. 15A | CB | 0.04 | 50 | 0.02 | 8 | 100 Pa or less | 109 | 2.304 | 106 | 2.255 |
| Ex. 16A | Activated carbon | 5 | 1600 | 2 | 20 | 100 Pa or less | 108 | 2.252 | 105 | 2.120 |
| Ex. 17A | CB | 0.2 | 18 | 1 | 20 | N2 | 101 | 2.245 | 99 | 2.152 |
| Ex. 18A | AB | 0.04 | 60 | 10 | 57 | Ar | 98 | 2.213 | 93 | 2.018 |
| Comp. Ex. 4A | Artificial graphite | 2 | 12 | 1 | 34 | Dry Air | 103 | 2.192 | 92 | 2.030 |

TABLE 4

| | Amorphous Carbon Material | Average Particle size (μm) | BET Specific Surface Area (m²/g) | Carbon Material Content (wt %) | Surface Layer Portion Thickness Ratio (%) | Atmosphere | Initial Period | | After High Temperature Storage* | |
|---|---|---|---|---|---|---|---|---|---|---|
| | | | | | | | $C_0$ (mAh) | $V_0$ (V) | $C_1$ (mAh) | $V_1$ (V) |
| Ex. 19A | AB | 0.04 | 60 | 0.2 | 34 | Ar | 105 | 2.342 | 45 | 2.238 |
| Ex. 20A | KB | 0.03 | 800 | 1 | 20 | 100 Pa or less | 103 | 2.347 | 43 | 2.201 |
| Comp. Ex. 5A | None | — | — | — | — | — | 104 | 2.250 | 28 | 1.852 |

*Stored at 80° C. after discharging 50% of the designed capacity

As is clear from Table 3, in any of Examples 12A to 17A of the present invention, the lowest voltage in the pulse discharge −40° C. greatly exceeded 2.188 V in Comparative Example 1A, showing improvement in initial performance in large current discharge at low temperature. Also, since discharge capacity at ambient temperature in each Example exceeded the designed capacity (100 mAh) as well, no adverse effects were seen in other aspects of discharge performance.

On the other hand, from comparison between Example 12A and Comparative Example 4A which used artificial graphite, i.e., crystalline carbon material, it is clear that improvement effects on pulse discharge performance −40° C. became obvious by usage of the amorphous carbon material. This is probably because the reduction-deomposition reaction of the electrolyte at the interface between crystalline carbon material and the electrolyte was greater than the reduction-deomposition reaction of the electrolyte at the interface between the amorphous carbon material and the electrolyte, and reaction resistance at the interface formed by decomposition product was increased.

In Example 18A, in which the acetylene black content in the surface layer portion was large, i.e., 10 wt % and the thickness of the surface layer portion exceeded the half of the entire negative electrode, although initial discharge capacity became lower than the designed capacity and the battery energy density declined, improvement effects were seen in the pulse discharge performance −40° C. The decline in initial discharge capacity is probably because of the large amount of acetylene black. That is, the degree of reduction-deomposition reaction of the electrolyte at the interface between acetylene black and electrolyte became large, and reaction resistance at the interface increased. Therefore, to improve low temperature discharge performance, the amorphous carbon material content at the surface layer portion is preferably set to 5 wt % or less, and the thickness of the surface layer portion is preferably set to ⅓ or less of the entire negative electrode.

In Example 17A, in which the integration of lithium metal and carbon black was carried out in a dry nitrogen atmosphere, initial capacity became 101 mAh, i.e., lower than that of Comparative Example 1A. Also, pulse discharge performance −40° C. in Example 17A was 2.245 V, and the improvement effects were less than that of Examples 12A to 15A, in which the integration was carried out in an argon atmosphere or under vacuum of 100 Pa or less. This is probably because the melted lithium and nitrogen reacted and lithium nitride ($Li_3N$) was formed in the integration process. $Li_3N$ reacts with a very small amount of water in dry air and a very small amount of water in the electrolyte at the time of battery assembly, and causes reactions of lithium hydroxide production and electrolyte decomposition. Based on these, it can be assumed that the electrolyte and the amount of lithium that can be discharged were decreased. Therefore, carbon black and lithium metal were preferably integrated in an argon atmosphere. Additionally, when carbon black and lithium metal are integrated in a reduced-pressure atmosphere of 100 Pa or less, impregnation of carbon black particles, which are porous and small in bulk density, with melted lithium is accelerated. Therefore, integration of lithium and carbon black becomes further easy.

In Examples 12A, 13A, and 15A, in which amorphous carbon material includes primary particles with an average particle size of 0.1 μm or less and a BET specific surface area of 20 m²/g or more, no decline in initial discharge capacity was seen, and the lowest voltage in the pulse discharge −40° C. was about 2.3 V. That is, in Example 12A, 13A, and 15A, the lowest voltage in the pulse discharge at −40° C. was about 2.3 V, and the effects of curbing the voltage drop in the early stage of discharge were great.

When $MnO_2$ was used as the positive electrode active material, as shown in Table 4, initial discharge capacities of Examples 19A and 20A were almost the same as that of Comparative Example 5A. However, the pulse discharge voltages −40° C. were 2.34 V or more, an improvement by about 0.1 V compared with 2.25 V in Comparative Example 5A. When $MnO_2$ was used as the positive electrode active material, since the electrolyte was different as well, the interface reaction of the negative electrode and the electrolyte, and polarization contribution degree of the positive and negative electrodes at low temperature discharge probably change. However, the results in Table 4 show that even when $MnO_2$ was used as the positive electrode active material, the same improvement effects as the case when graphite fluoride was used as the positive electrode active material can be obtained.

Effects of the present invention are to decrease the reaction resistance of the negative electrode, and to improve discharge voltage at low temperature discharge, by controlling the interface reaction of the negative electrode and the electrolyte. Therefore, as long as the solid positive electrode active material is used, the effects of the present invention are not greatly different, and the same effects can be obtained even by using various oxides and fluorides.

With regard to discharge capacity after high temperature storage, in any of Examples of the present invention, the capacity same as that of Comparative Example 1A or more remained, capacity deterioration at high temperature storage was less. However, in Comparative Example 4A, in which artificial graphite, i.e., crystalline carbon material, was used, a capacity decline in about 10% was seen, and deterioration by high temperature storage was great.

Additionally, regarding pulse performance at a low temperature −40° C., Comparative Example 1A showed a drop to 1.92 V, whereas any of Examples 12A to 18A and Comparative Example 4A showed 2 V or more, achieving the effects of improvement in low temperature discharge performance after high temperature storage. Especially in Examples 12A to 17A, a high discharge voltage of 2.1 V or more was obtained. Among them, in Examples 12A, 13A, and 15A, in which carbon black included primary particles with an average particle size of 0.1 μm or less and a BET specific surface area of 20 $m^2$/g or more, discharge voltage was about 2.25 V, and improvement effects of discharge performance were notably obtained.

In battery after storage at 80° C. in Comparative Example 5, only 28 mAh was discharged, i.e., about a half of the remaining capacity (50 mAh), whereas in batteries in Examples 19A and 20A, discharge capacities of 45 mAh, and 43 mAh were obtained, respectively. Further, in pulse discharge −40° C. after storage at 80 as well, the drop was large in Comparative Example 5A, i.e., to 1.85 V, whereas in Examples 19A and 20A, the voltage drop were 2.238 V and 2.201 V, respectively, showing a great improvement in storage characteristics at high temperature. Therefore, even in the case where oxides were used for the positive electrode active material, by using the negative electrode integrated with amorphous carbon material of the present invention, interface reactions between the negative electrode and the electrolyte were controlled, and the effects of curbing the increase in reaction resistance of the negative electrode can be obtained, and storage characteristics at high temperature can be greatly improved.

From the results above, it is clear that by using the negative electrode including amorphous carbon material, large current discharge performance at low temperature can be greatly improved even after high temperature storage. However, when crystalline carbon material was used, in the case where the amount of the amorphous carbon material used was large, or in the case where the surface layer portion was thick, the improvement effects were small. In such cases, it was assumed that the electrolyte decomposition reaction advanced at the interface between the negative electrode and the electrolyte, and the decomposition product was accumulated at the interface, which formed a new reaction resistance.

As a result of AC impedance measurement for each battery, in any of the batteries using the negative electrode integrated with carbon material in Examples and Comparative Examples, an arc portion became smaller than that of batteries using the negative electrode comprising a simple substance of lithium in Comparative Examples 4A and 5A. This is probably because the reaction resistance at the interface between the negative electrode and the electrolyte became small. However, since correlation between the reaction resistance value estimated from the diameter of the reaction arc obtained by Cole-Cole plot, and the lowest voltage in pulse discharge at −40° C. was unclear, the effects of improvement in discharge performance could not be estimated from AC impedance measurement results. Correlation between the results of AC impedance in batteries after storage at 80° C. and discharge performance was also similar.

EXAMPLE 1B (i) Preparation of Positive Electrode

For a positive electrode active material, petroleum coke was fluorinated and used as graphite fluoride ($CF_x$:x=1.02). Graphite fluoride, acetylene black (conductive material), and styrene butadiene rubber (SBR)(binder) were blended in a weight ratio of 100:15:6, and kneaded sufficiently by using a mixed solution of water and ethanol as a dispersion medium. After drying the obtained mixture at 100° C., by using a predetermined mold and a hydraulic press, the mixture was compression molded to give a disk-form, to obtain a positive electrode.

(ii) Preparation of Negative Electrode

For a negative electrode active material, lithium metal was used, and for microparticles, $Al_2O_3$ manufactured by Sumitomo Chemical Co., Ltd. (product number AA07) was used. The average particle size of the primary particles of $Al_2O_3$ was 0.7 μm and the BET specific surface area was 10 $m^2$/g. $Al_2O_3$ was dried at 120° C. under reduced pressure, and then introduced to a negative electrode preparation atmosphere (argon gas atmosphere).

A lithium metal sheet with a thickness of 200 μm was introduced to the negative electrode preparation atmosphere, and on the surface thereof, $Al_2O_3$ dried under reduced pressure was sprayed homogenously at a rate of 9g/$m^2$. Afterwards, the lithium metal sheet was rolled by using a roller press device, with a polyethylene film having a thickness of 40 μm interposed therebetween. The rolled sheet was stamped into a disk-form with a die, to obtain a negative electrode with a surface layer portion to which microparticles were embedded. The negative electrode was, as shown in FIG. 1, attached by pressure to an inner face of a negative electrode case 2 with an insulating packing 3 mounted thereon.

Figure 5:
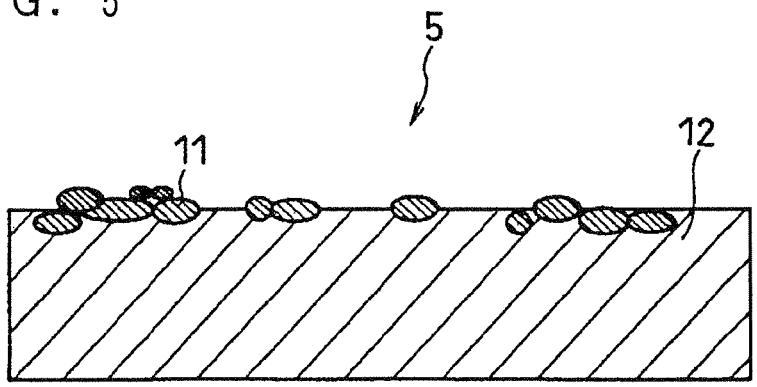
[FIG. 5] A schematic cross sectional view of another example of the negative electrode of the present invention.

FIG. 5 shows a schematic cross sectional view of the obtained negative electrode 5. The negative electrode 5 comprises lithium 12 and in its surface layer portion, $Al_2O_3$ microparticles 11 are scattered and embedded. A portion of the primary particles forming secondary particle is fixed in the proximity of the surface without being embedded to the surface layer portion.

(iii) Preparation of Organic Electrolyte

To γ-butyrolactone (γBL: non-aqueous solvent), lithium tetrafluoroborate ($LiBF_4$: solute) was dissolved at a concentration of 1 mol/L and used as an electrolyte.

(iv) Battery Assembly

A positive electrode 4 was placed on an inner bottom face of a positive electrode case 1, and covered with a separator 6 (thickness of 100 μm) of polypropylene nonwoven fabric stamped to give a circular shape. Afterwards, an electrolyte was injected into the positive electrode case 1, to impregnate the positive electrode 4 and the separator 6 with the electrolyte. Then, the negative electrode case 2 to which the negative electrode 5 was attached was attached to the positive electrode case 1, so that the negative electrode 5 and the positive electrode 4 face each other. The peripheral end portion of the positive electrode case 1 was crimped to an insulating packing 3 attached to the negative electrode case 2, to complete a sealed coin-type battery 10. The battery had a diameter of 23 mm, a height of 2 mm, and a designed capacity of 110 mAh. The above assembly processes were carried out in dry air with a dew point −50° C. or less. The same coin-type batteries were made to produce 10 batteries.

COMPARATIVE EXAMPLE 1B

Ten coin-type batteries were made in the same manner as Example 1B, except that $Al_2O_3$ microparticles were not embedded to the negative electrode surface layer portion, and a lithium metal sheet was stamped into a disk-form and used as is as a negative electrode.

EXAMPLE 2B

Ten coin-type batteries were made in the same manner as Example 1B, except that artificial graphite (manufactured by Nippon Graphite Industries, ltd., an average particle size of 2 μm(primary particles), a BET specific surface area of 15 m²/g) was used instead of $Al_2O_3$ microparticles.

EXAMPLE 3B

Ten coin-type batteries were made in the same manner as Example 1B, except that α-$Fe_2O_3$ (manufactured by Kojundo Chemical Laboratory Co., Ltd., an average particle size of 1 μm (primary particles), a BET specific surface area of 25 m²/g) was used instead of $Al_2O_3$ microparticles.

EXAMPLE 4B

Ten coin-type batteries were made in the same manner as Example 1B, except that $Li_3PO_4$ (manufactured by Kanto Chemical Co., Inc., an average particle size of 2 μm (primary particles), a BET specific surface area of 2.6 m²/g) was used, instead of $Al_2O_3$ microparticles.

EXAMPLE 5B

Ten coin-type batteries were made in the same manner as Example 1B, except that $SiO_2$ (manufactured by Kojundo Chemical Laboratory Co., Ltd., an average particle size of 0.5 μm(primary particles), a BET specific surface area of 50 m²/g) was used instead of $Al_2O_3$ microparticles.

EXAMPLE 6B

Ten coin-type batteries were made in the same manner as Example 1B, except that acetylene black (manufactured by Denki Kagaku Kogyo Kabushiki Kaisha, an average particle size of 0.04 μm (primary particles), a BET specific surface area of 60 m²/g) was used instead of $Al_2O_3$ microparticles.

EXAMPLE 7B

Ten coin-type batteries were made in the same manner as Example 1B, except that for the organic electrolyte, $LiCF_3SO_3$ (solute) was dissolved in a 3:1 (volume ratio) solvent mixture (non-aqueous solvent) of propylene carbonate (PC) and 1,2-dimethoxyethane (DME), with a concentration of 1 mol/L and used.

EXAMPLE 8B

Ten coin-type batteries were made in the same manner as Example 1B, except that carbon black (an average particle size of 0.1 μm(primary particles), a BET specific surface area of 50 m²/g) was used instead of $Al_2O_3$ microparticles.

EXAMPLE 9B

Ten coin-type batteries were made in the same manner as Example 1B, except that ketjen black (an average particle size of 0.03 μm (primary particles), a BET specific surface area 800 m²/g) was used instead of $Al_2O_3$ microparticles.

EXAMPLE 10B

Ten coin-type batteries were made in the same manner as Example 1B, except that petroleum coke (an average particle size of 1 μm (primary particles), a BET specific surface area of 20 m²/g) was used instead of $Al_2O_3$ microparticles.

EXAMPLE 11B

Ten coin-type batteries were made in the same manner as Example 1B, except that SiC microparticles (an average particle size of 2 μm (primary particles), a BET specific surface area of 8 m²/g) was used instead of $Al_2O_3$ microparticles.

EXAMPLE 12B

Ten coin-type batteries were made in the same manner as Example 1B, except that $ZrO_2$ microparticles (an average particle size of 1 μm (primary particles), a BET specific surface area of 5 m²/g) was used instead of $Al_2O_3$ microparticles.

EXAMPLE 13B

Ten coin-type batteries were made in the same manner as Example 1B, except that $Li_2SO_4$ microparticles (an average particle size of 2 μm (primary particles), a BET specific surface area 1.8 m²/g) was used instead of $Al_2O_3$ microparticles.

EXAMPLE 14B

Ten coin-type batteries were made in the same manner as Example 1B, except that activated carbon microparticles (an average particle size of 2 μm(primary particles), a BET specific surface area of 1500 m²/g) instead of $Al_2O_3$ microparticles.

COMPARATIVE EXAMPLE 2B

Ten coin-type batteries were made in the same manner as Example 1B, except that $SiO_2$ (an average particle size of 15 μm(primary particles), a BET specific surface area of 2 m²/g) was used instead of $Al_2O_3$ microparticles.

COMPARATIVE EXAMPLE 3B

Ten coin-type batteries were made in the same manner as Example 1B, except that $SiO_2$ (an average particle size of 5 μm(primary particles), a BET specific surface area of 7 m²/g) was used instead of $Al_2O_3$ microparticles.

[Evaluation 1]

A battery in each of Examples 1B to 14B and Comparative Examples 1B to 3B was preliminary discharged at a constant current of 5 mA for 30 minutes. Then, the batteries were aged at 60° C. for 1 day, to stabilize the battery open circuit voltage (OCV). Afterwards, the OCV and impedance at 1 kHz were determined for each battery at ambient temperature, and no abnormality was confirmed in each battery.

(Discharge Capacity)

After aging, three batteries in each of Examples and Comparative Examples were discharged to 2 V at 25° C. with a constant resistance of 15kΩ, to check the initial discharge capacity ($C_0$). Table 5 shows the average value of the three batteries.

(Large Current Discharge Performance at Low Temperature)

After aging, 3 batteries from each of Examples and Comparative Examples were pulse discharged −40° C., to evaluate large current discharge performance at low temperature. To be specific, the battery was discharged with a constant current of 10 mA for 1 second, and allowed to stand for 59 seconds: this pattern was repeated 30 cycles, and a pulse voltage value for each cycle was determined. The lowest initial low temperature pulse voltage ($V_0$) in 30 cycles were obtained. Table 5 shows the average value of the three batteries.

TABLE 5

| | Microparticles | Average Particle Size (μm) | BET Specific Surface Area (m$^2$/g) | Initial C$_0$ (mAh) | Initial V$_0$ (V) |
|---|---|---|---|---|---|
| Ex. 1B | Al$_2$O$_3$ | 0.7 | 10 | 112 | 2.353 |
| Ex. 2B | Artificial Graphite | 2 | 15 | 110 | 2.340 |
| Ex. 3B | α-Fe$_2$O$_3$ | 1 | 25 | 113 | 2.305 |
| Ex. 4B | Li$_3$PO$_4$ | 2 | 2.6 | 112 | 2.288 |
| Ex. 5B | SiO$_2$ | 0.5 | 50 | 115 | 2.341 |
| Ex. 6B | Acetylene Black | 0.04 | 60 | 114 | 2.395 |
| Ex. 7B | Al$_2$O$_3$ | 0.7 | 10 | 118 | 2.356 |
| Ex. 8B | Carbon Black | 0.1 | 20 | 112 | 2.398 |
| Ex. 9B | Ketjen Black | 0.03 | 800 | 113 | 2.411 |
| Ex. 10B | Petroleum Coke | 1 | 20 | 112 | 2.387 |
| Ex. 11B | SiC | 2 | 8 | 111 | 2.275 |
| Ex. 12B | ZrO$_2$ | 1 | 5 | 112 | 2.307 |
| Ex. 13B | Li$_2$SO$_4$ | 2 | 1.8 | 111 | 2.283 |
| Ex. 14B | Activated Carbon | 2 | 1500 | 112 | 2.316 |
| Comp. Ex. 1B | None | — | — | 112 | 2.125 |
| Comp. Ex. 2B | SiO$_2$ | 15 | 2 | 108 | 2.173 |
| Comp. Ex. 3B | SiO$_2$ | 5 | 7 | 110 | 2.175 |

As is clear from Table 5, in the battery in any of Examples, the lowest voltage in the pulse discharge −40° C. greatly exceeded 2.125 V in Comparative Example 1B, initial large current discharge performance at low temperature improved. Also, in the battery in any of Examples, initial discharge capacity (designed capacity of 110 mAh or more) equivalent with that of Comparative Example or more could be obtained. Therefore, despite the improvement in initial large current discharge performance at low temperature, other aspects of discharge performance were not declined.

Especially, in Examples 6B, 8B, and 9B, in which carbon particles with an average particle size of 0.1 μm or less were used, and in Examples 6B, 8B, 9B, and 10B in which carbon particles with a BET specific surface area of 20 m$^2$/g or more were used, the pulse discharge voltage −40° C. was 2.38 V or more, obtaining an improvement effect of 0.25 V or more compared with that of Comparative Example 1B.

Generally, a certain degree of correlation is thought to be present between the average particle size and the specific surface area of the carbon material. However, in Examples 6B and 9B, in which the average particle size was 0.04 μm or less, and in Example 10B, in which the average particle size was 1 μm and the specific surface area was 20 m$^2$/g, no great difference could be seen in pulse discharge voltage. The above shows that not only the particle size of the microparticles, but also the specific surface area of the microparticles is a significant factor for improvement in discharge performance. This is consistent with the idea that the effects of improving the performance depend on the electrolyte decomposition reaction and the protective layer formed at the negative electrode surface by the reaction product.

Further, in Examples 6B, 8B, and 9B, in which carbon black with an average particle size of 0.1 μm or less and a BET specific surface area of 20 m$^2$/g or more was used as the microparticles, the pulse discharge voltage −40° C. was about 3.4 V, showing a great improvement in discharge performance.

In Comparative Example 2B, in which large particles with an average particle size of 15 μm were used, and in Comparative Example 3B, in which particles with an average particle size of 5 μm were used, the pulse discharge voltage −40° C. was improved to about 0.05 V. However, when compared with each Example of the present invention, improvement effects became quite small. Further, the discharge capacity in Comparative Example 2B was 108 mAh, showing a decrease, though slightly, compared with Comparative Example 1B. Therefore, adverse effects on discharge performance can be expected when large particles are used.

EXAMPLE 15B

A positive electrode was obtained in the same manner as Example 1B, except that manganese dioxide (MnO$_2$) was used for the positive electrode active material, and MnO$_2$, ketjen black (conductive material), fluorocarbon resin (binder: solid content of NEOFLON FEP manufactured by DAIKIN INDUSTRIES, LTD.) were blended in a weight ratio of 100:3:6. By using this positive electrode, ten coin-type batteries with the designed capacity of 100 mAh were made in the same manner as Example 1B, except that for the organic electrolyte, LiCF$_3$SO$_3$ (solute) was dissolved in a 1:1 (volume ratio) solvent mixture (non-aqueous solvent) of propylene carbonate(PC) and 1,2-dimethoxyethane (DME) with a concentration of 1 mol/L.

EXAMPLE 16B

Ten coin-type batteries were made in the same manner as Example 15B, except that artificial graphite (manufactured by Nippon Graphite Industries, ltd., primary particles with an average particle size of 2 μm, and a BET specific surface area of 15 m$^2$/g) was used instead of Al$_2$O$_3$ microparticles.

EXAMPLE 17B

Ten coin-type batteries were made in the same manner as Example 15B, except that ketjen black (an average particle size of 0.03 μm, and a BET specific surface area 800 m$^2$/g) was used instead of Al$_2$O$_3$ microparticles.

EXAMPLE 18B

Ten coin-type batteries were made in the same manner as Example 15B, except that carbon black (primary particles with an average particle size of 0.1 μm, and a BET specific surface area of 50 m$^2$/g) was used instead of Al$_2$O$_3$ microparticles.

COMPARATIVE EXAMPLE 4B

Ten coin-type batteries were made in the same manner as Example 15B, except that a lithium metal sheet was stamped into a disk-form and used as is as a negative electrode without embedding the microparticles to the negative electrode surface layer portion.

[Evaluation 2]

A battery in each of Examples 15B to 18B and Comparative Example 4B was discharged at a constant current of 5 mA for 30 minutes. Then, the batteries were aged at 60° C. for 1 day, to stabilize the battery open circuit voltage (OCV). Afterwards, the OCV and impedance at 1 kHz were determined for each battery at ambient temperature, and no abnormality was confirmed in each battery.

(Discharge Capacity)

After aging, three batteries from each of Examples and Comparative Examples were discharged at 25° C. with a constant resistance of 15kΩ until 2 V, to check the initial discharge capacity ($C_0$). Table 6 shows the average value of the three batteries.

(Large Current Discharge Performance at Low Temperature)

After aging, three batteries from each of Examples and Comparative Examples were pulse discharged −40° C., to evaluate large current discharge performance at low temperature. To be specific, the batteries were discharged at a constant current of 12 mA for 1 second, and allowed to stand for 59 seconds: this pattern was repeated 20 cycles, and pulse voltage value in each cycle was determined. The lowest initial low temperature pulse voltage ($V_0$) in 20 cycles was obtained. Table 6 shows the average value of the three batteries.

TABLE 6

| | Microparticles | Average Particle Size (μm) | BET Specific Surface Area (m²/g) | Initial Period $C_0$ (mAh) | Initial Period $V_0$ (V) |
|---|---|---|---|---|---|
| Ex. 15B | Al₂O₃ | 0.7 | 10 | 102 | 2.328 |
| Ex. 16B | Artificial Graphite | 2 | 15 | 101 | 2.343 |
| Ex. 17B | Ketjen Black | 0.03 | 800 | 103 | 2.365 |
| Ex. 18B | Carbon Black | 0.1 | 20 | 105 | 2.380 |
| Comp. Ex. 4B | None | — | | 100 | 2.255 |

As is clear from Table 6, in batteries in any of Examples, the lowest voltage in the pulse discharge −40° C. greatly exceeded 2.255 V in Comparative Example 4B, showing an improvement in initial large current discharge performance at low temperature. Additionally, in batteries in any of Examples, the initial discharge capacity (designed capacity of 100 mAh) equivalent to that of Comparative Example or more was obtained. Thus, despite the improvement in initial large current discharge performance at low temperature, other aspects of discharge performance are not declined.

Especially in Examples 17B and 18B, in which carbon particles with an average particle size of 0.1 μm or less were used, the pulse discharge voltage −40° C. was 2.36 V or more, obtaining improvement effects of 0.11 V or more compared with Comparative Example 4B.

As described above, even with the positive electrode active material of oxide, by embedding microparticles on the negative electrode surface layer portion, the effects of improving the large current discharge performance at low temperature were obtained. Notable effects were obtained especially when carbon particles with an average particle size of 0.1 μm and carbon particles with a BET specific surface area of 20 m²/g were used.

[Evaluation 3]

After aging, four batteries from each of Examples 1B, 2B, 6B, 7B, and 8B, and Comparative Examples 1B and 2B were used to evaluate stability at high temperature storage. Each battery after aging was stored at 100° C. for 5 days.

(Discharge Capacity)

Among the batteries after storage at 100° C. for 5 days, two batteries from each of Examples and Comparative Examples were discharged to 2 V with a constant resistance of 15 kΩ at 25° C., to check discharge capacity ($C_1$) after high temperature storage. Table 7 shows the average value of the two batteries.

(Large Current Discharge Performance at Low Temperature)

Among the batteries stored at 100° C. for 5 days, two batteries from each of Examples and Comparative Examples were pulse discharged −40° C., to evaluate large current discharge performance at low temperature. To be specific, the batteries were discharged at a constant current of 12 mA for 1 second, and allowed to stand for 59 seconds: this pattern was repeated for 20 cycles, and pulse voltage value in each cycle was determined. The lowest initial low temperature pulse voltage($V_1$) in 20 cycles was obtained. Table 7 shows the average value of the two batteries.

TABLE 7

| | Microparticles | Electrolyte | After Storage $C_1$ (mAh) | After Storage $V_1$ (V) |
|---|---|---|---|---|
| Ex. 1B | Al₂O₃ | LiBF₄/γBL | 101 | 2.115 |
| Ex. 2B | Artificial Graphite | LiBF₄/γBL | 105 | 2.129 |
| Ex. 6B | AB | LiBF₄/γBL | 108 | 2.193 |
| Ex. 7B | Al₂O₃ | LiCF₃SO₃/ (PC + DME) | 97 | 2.084 |
| Ex. 8B | Carbon Black | LiBF₄/γBL | 106 | 2.205 |
| Comp. Ex. 1B | None | LiBF₄/γBL | 100 | 1.942 |
| Comp. Ex. 2B | SiO₂ | LiBF₄/γBL | 94 | 1.983 |

In Example 1B, in which LiBF₄/γBL was used for the electrolyte, the discharge capacity was 101 mAh and the low temperature pulse voltage was 2.115 V even after high temperature storage, being superior to Comparative Example 1B. On the other hand, in Example 7B, in which LiCF₃SO₃/(PC+DME) was used for the electrolyte, the discharge capacity after storage was 97 mAh and the low temperature pulse voltage was dropped to 2.084 V, showing a greater deterioration than in Examples 1B, 2B, and 6B. Since the battery after storage in Example 7B was a little swollen, it can be considered that due to the high temperature storage, the electrolyte decomposition reaction advanced to generate a comparatively large amount of gas, leading to a greater extent of deterioration. Therefore, in view of improving stability at high temperature, usage of LiBF₄/γBL for the electrolyte is better.

In Comparative Example 2B, the capacity after high temperature storage dropped to 94 mAh, showing a greater capacity decline by high temperature storage than in Comparative Example 1B. Since the discharge capacity before storage was a little low, i.e., 108 mAh, the presence of large particles between the positive electrode and the negative electrode probably caused non-uniform discharge reaction and decline in the capacity.

In Example 2B, in which artificial graphite was used for microparticles, the capacity after high temperature storage was 105 mAh and the low temperature pulse voltage was 2.129 V, achieving excellent results. Additionally, in Examples 6B and 8B, in which carbon black with an average particle size of 0.1 μm or less, or a BET specific surface area of 20 m²/g or more, the low temperature pulse voltage was about 2.2 V, achieving further excellent results.

INDUSTRIAL APPLICABILITY

A lithium primary battery of the present invention is excellent in large current discharge performance at low temperature, storage characteristics at high temperature, safety, and reliability, and is useful for a power source for mobile electronic devices.

The invention claimed is:

1. A lithium primary battery comprising: a positive electrode, a negative electrode, an organic electrolyte, and a separator interposed between said positive electrode and said negative electrode,
   wherein said negative electrode includes a negative electrode active material, said negative electrode active material comprising at least one selected from the group consisting of a lithium metal and a lithium alloy;
   said negative electrode includes a surface layer portion comprising a composite of an amorphous carbon material and said negative electrode active material, and a lower layer portion comprising said negative electrode active material, said lower layer portion not including said amorphous carbon material, said surface layer portion facing said positive electrode with said separator interposed therebetween; and
   a thickness of said surface layer portion comprising said composite is ⅓ or less of a thickness of said negative electrode.

2. The lithium primary battery in accordance with claim 1, wherein an amorphous carbon material content in a total of said negative electrode active material and said amorphous carbon material is 5 wt % or less.

3. The lithium primary battery in accordance with claim 1, wherein said positive electrode includes a positive electrode active material, a conductive material, and a binder, said positive electrode active material comprising a metal oxide or graphite fluoride.

4. The lithium primary battery in accordance with claim 1, wherein said amorphous carbon material is microparticles comprising primary particles with an average particle size of 0.1 μm or less.

5. The lithium primary battery in accordance with claim 1, wherein said amorphous carbon material is microparticles with a BET specific surface area of 20 m$^2$/g or more.

6. The lithium primary battery in accordance with claim 1, wherein said amorphous carbon material is a carbon black of at least one selected from the group consisting of acetylene black, ketjen black, contact black, furnace black, and lamp black.

7. The lithium primary battery in accordance with claim 1, wherein said organic electrolyte comprises a non-aqueous solvent for dissolving a solute, said solute including lithium tetrafluoroborate, and said non-aqueous solvent including γ-butyrolactone.

8. A method for manufacturing a lithium primary battery, comprising the steps of:
   (1) preparing a mixture including an amorphous carbon material and a negative electrode active material, said negative electrode active material comprising at least one selected from the group consisting of a lithium metal and a lithium alloy;
   (2) rolling said mixture to form a mixture sheet;
   (3) attaching said mixture sheet to sheet of said negative electrode active material by pressure, to obtain a negative electrode including a composite of said negative electrode active material and said amorphous carbon material in at least a surface layer portion thereof; and
   (4) allowing said surface layer portion comprising said composite to face a positive electrode with a separator interposed therebetween.

9. The method for manufacturing a lithium primary battery in accordance with claim 8, wherein said steps (1) to (3) are carried out in an argon gas atmosphere or in an atmosphere of a reduced pressure of 100 Pa or less.

10. The method for manufacturing a lithium primary battery in accordance with claim 8, wherein said amorphous carbon material is microparticles comprising primary particles with an average particle size of 0.1 μm or less.

11. The method for manufacturing a lithium primary battery in accordance with claim 8, wherein said amorphous carbon material is microparticles with a BET specific surface area of 20 m$^2$/g or more.

12. The method for manufacturing a lithium primary battery in accordance with claim 8, wherein said amorphous carbon material is a carbon black of at least one selected from the group consisting of acetylene black, ketjen black, contact black, furnace black, and lamp black.

13. A lithium primary battery comprising a positive electrode, a negative electrode, an organic electrolyte, and a separator interposed between said positive electrode and said negative electrode,
   said negative electrode includes a negative electrode active material, said negative electrode active material comprising at least one selected from the group consisting of a lithium metal and a lithium alloy;
   said negative electrode includes a surface layer portion to which microparticles are embedded, said microparticles comprising primary particles with an average particle size of 2 μm or less, and said surface layer portion facing said positive electrode with said separator interposed therebetween.

14. The lithium primary battery in accordance with claim 13, wherein said microparticles comprise at least one selected from the group consisting of $Al_2O_3$, $Fe_2O_3$, SiC, $SiO_2$, and $ZrO_2$.

15. The lithium primary battery in accordance with claim 13, wherein said microparticles comprise at least one selected from the group consisting of $Li_3PO_4$ and $Li_2SO_4$.

16. The lithium primary battery in accordance with claim 13, wherein said microparticles comprise at least one selected from the group consisting of graphite, petroleum coke, and activated carbon.

* * * * *